US012769094B2

(12) United States Patent
Chang et al.

(10) Patent No.: US 12,769,094 B2
(45) Date of Patent: Oct. 20, 2026

(54) OPTICAL LENS ASSEMBLY, IMAGING APPARATUS AND ELECTRONIC DEVICE

(71) Applicant: LARGAN PRECISION CO., LTD., Taichung City (TW)

(72) Inventors: Chien-Pang Chang, Taichung City (TW); Pei-Chi Chang, Taichung City (TW); Chun-Hung Teng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 85 days.

(21) Appl. No.: 18/964,632

(22) Filed: Dec. 1, 2024

(65) Prior Publication Data

US 2025/0102778 A1 Mar. 27, 2025

Related U.S. Application Data

(63) Continuation of application No. 17/389,505, filed on Jul. 30, 2021, now Pat. No. 12,196,928.

(Continued)

(30) Foreign Application Priority Data

Jun. 15, 2021 (TW) ................................ 110121792

(51) Int. Cl.

*G02B 13/00* (2006.01)
*G02B 1/04* (2006.01)

(Continued)

(52) U.S. Cl.

CPC ............. *G02B 13/008* (2013.01); *G02B 1/04* (2013.01); *G02B 5/003* (2013.01); *G02B 5/208* (2013.01); *H04M 1/0264* (2013.01); *H04N 23/54* (2023.01)

(58) Field of Classification Search

CPC ........ G02B 13/008; G02B 1/04; G02B 5/003; G02B 5/208; G02B 5/22; G02B 5/282;

(Continued)

(56) References Cited

U.S. PATENT DOCUMENTS

2004/0165095 A1 8/2004 Shimizu
2005/0013018 A1 1/2005 Ning (Continued)

FOREIGN PATENT DOCUMENTS

CN 102053341 A 5/2011
CN 105589123 A 5/2016

(Continued)

*Primary Examiner* — Balram T Parbadia

(74) *Attorney, Agent, or Firm* — McClure, Qualey & Rodack, LLP

(57) ABSTRACT

An optical lens assembly includes at least two optical lens elements. At least one of the optical lens elements includes a long wavelength absorbing material, the optical lens element including the long wavelength absorbing material is made of a plastic material, and the long wavelength absorbing material is evenly mixed with the plastic material. At least one of the optical lens elements includes a long wavelength filter coating, the optical lens element including the long wavelength filter coating is made of a plastic material, and the long wavelength filter coating is arranged on an object-side surface or an image-side surface of the optical lens element. The long wavelength filter coating includes a plurality of high refractive index coating layers and a plurality of low refractive index coating layers, and the high refractive index coating layers and the low refractive index coating layers are stacked in alternations.

12 Claims, 10 Drawing Sheets

Related U.S. Application Data

(60) Provisional application No. 63/060,167, filed on Aug. 3, 2020.

(51) Int. Cl.

| | |
|---|---|
| ***G02B 5/00*** | (2006.01) |
| ***G02B 5/20*** | (2006.01) |
| ***H04M 1/02*** | (2006.01) |
| ***H04N 23/54*** | (2023.01) |

(58) Field of Classification Search

CPC .... G02B 5/285; G02B 1/041; G02B 13/0015; G02B 5/223; G02B 5/281; G02B 13/00; G02B 5/00; G02B 5/20; H04M 1/0264; H04M 1/02; H04N 23/54; H04N 5/225

See application file for complete search history.

(56) References Cited

U.S. PATENT DOCUMENTS

| | | | |
|---|---|---|---|
| 2005/0225878 | A1 | 10/2005 | Tanaka et al. |
| 2006/0056061 | A1 | 3/2006 | Chen |
| 2008/0100910 | A1 | 5/2008 | Kim et al. |
| 2012/0176668 | A1 | 7/2012 | Saito et al. |
| 2013/0155495 | A1 | 6/2013 | Wang |
| 2013/0222894 | A1 | 8/2013 | Hung |
| 2014/0016188 | A1 | 1/2014 | Liu |
| 2015/0029582 | A1 | 1/2015 | Chang et al. |
| 2015/0062695 | A1 | 3/2015 | Chu et al. |
| 2015/0241602 | A1 | 8/2015 | Avetisian |
| 2016/0004046 | A1 | 1/2016 | Asami |
| 2016/0103247 | A1 | 4/2016 | Hitomi |
| 2016/0116653 | A1 | 4/2016 | Murayama |
| 2016/0178816 | A1 | 6/2016 | Takahashi |
| 2016/0349420 | A1 | 12/2016 | Chang |
| 2017/0198083 | A1 | 7/2017 | Kim et al. |
| 2018/0067231 | A1 | 3/2018 | Chang et al. |
| 2018/0067242 | A1 | 3/2018 | Lai |
| 2018/0113326 | A1 | 4/2018 | Gloege |
| 2018/0188428 | A1 | 7/2018 | Arimura |
| 2018/0231739 | A1 | 8/2018 | Bone et al. |
| 2019/0317253 | A1 | 10/2019 | Huang et al. |
| 2019/0317257 | A1 | 10/2019 | Chang et al. |
| 2020/0158912 | A1 | 5/2020 | Wang |

FOREIGN PATENT DOCUMENTS

| | | | |
|---|---|---|---|
| JP | 2000180625 | A | 6/2000 |
| TW | M591177 | U | 2/2020 |
| WO | 2015111316 | A1 | 7/2015 |

OPTICAL LENS ASSEMBLY, IMAGING APPARATUS AND ELECTRONIC DEVICE

RELATED APPLICATIONS

This application is a continuation of the U.S. application Ser. No. 17/389,505, filed Jul. 30, 2021, which claims priority to U.S. Provisional Application Ser. No. 63/060,167, filed Aug. 3, 2020, and Taiwan Application Serial Number 110121792, filed Jun. 15, 2021, which are herein incorporated by reference.

BACKGROUND

Technical Field

The present disclosure relates to an optical lens assembly and an imaging apparatus. More particularly, the present disclosure relates to an optical lens assembly and an imaging apparatus with compact size applicable to electronic devices for absorbing long wavelength light.

Description of Related Art

An optical lens assembly consists of a lens group and an image sensing element. Since the image sensing element is able to sense infrared rays, an infrared filter element needs to be disposed to prevent the image sensing element from sensing infrared rays and causing color shift. A traditional method for filtering infrared rays is to coat a planar element, so as to filter out near-infrared light by reflective interference. However, reflective interference will cause reflection and light leak where the incident light has a large incident angle, and an absorbing blue glass must be added to solve the light-leak problem. Therefore, the abovementioned two elements need to be disposed in the conventional optical lens assembly, so as to achieve the goals of filtering near-infrared light and solving light leak at the same time.

Furthermore, the technique of coating the surface of blue glass has also been developed to achieve the goals of filtering near-infrared light and solving light leak with a single element. However, coated blue glass has the problems such as high cost, difficult to be miniaturized and complicated manufacturing processes. Even though the technique of coating plastic lens appeared later, the coated plastic lens is unable to effectively solve the defects of color uniformity caused by the light leak at large angle, and thus the blue glass cannot be replaced by the coated plastic lens.

In this regard, the optical lens assembly still uses coated planar elements and blue glass as infrared filter elements for now. The sizes of the abovementioned elements are still an obstacle to the miniaturization of optical lens assembly. Although thinner blue glass has been successively introduced by the industry, the glass element, which is too thin, is easy to break to damage the entire optical lens assembly. Therefore, there is an urgent need currently for an important lens technology without the abovementioned elements but having high color uniformity.

SUMMARY

According to one aspect of the present disclosure, an optical lens assembly includes at least two optical lens elements. At least one of the at least two optical lens elements includes a long wavelength absorbing material, the at least one optical lens element including the long wavelength absorbing material is made of a plastic material, and the long wavelength absorbing material is evenly mixed with the plastic material. At least one of the at least two optical lens elements includes a long wavelength filter coating, the at least one optical lens element including the long wavelength filter coating is made of a plastic material, the long wavelength filter coating is arranged on an object-side surface or an image-side surface of the at least one optical lens element including the long wavelength filter coating, the long wavelength filter coating includes a plurality of high refractive index coating layers and a plurality of low refractive index coating layers, and the plurality of high refractive index coating layers and the plurality of low refractive index coating layers are stacked in alternations. When a total number of coating layers of the long wavelength filter coating is tLs, a total thickness of coating layers of the long wavelength filter coating is tTk, an average transmittance between a wavelength of 500 nm-600 nm of at least one of the at least one optical lens element including the long wavelength absorbing material and the at least one optical lens element including the long wavelength filter coating is T5060, and an average transmittance between a wavelength of 650 nm-1000 nm of at least one of the at least one optical lens element including the long wavelength absorbing material and the at least one optical lens element including the long wavelength filter coating is T65100, the following conditions are satisfied: $40 \leq tLs \leq 90$; 4000 nm$<tTk \leq$10000 nm; $75\% \leq T5060$; and $T65100 \leq 5\%$.

According to another aspect of the present disclosure, an imaging apparatus includes the optical lens assembly of the aforementioned aspect and an image sensor disposed on an image surface of the optical lens assembly.

According to another aspect of the present disclosure, an electronic device, which is a mobile device, includes the imaging apparatus of the aforementioned aspect.

According to another aspect of the present disclosure, an optical lens assembly includes at least three optical lens elements. At least one of the at least three optical lens elements includes a long wavelength filter coating, the at least one optical lens element including the long wavelength filter coating is made of a plastic material, the long wavelength filter coating is arranged on an object-side surface or an image-side surface of the at least one optical lens element including the long wavelength filter coating, the long wavelength filter coating includes a plurality of high refractive index coating layers and a plurality of low refractive index coating layers, and the plurality of high refractive index coating layers and the plurality of low refractive index coating layers are stacked in alternations. When a total number of coating layers of the long wavelength filter coating is tLs, a total thickness of coating layers of the long wavelength filter coating is tTk, an average transmittance between a wavelength of 400 nm-500 nm of the at least one optical lens element including the long wavelength filter coating is T4050, an average transmittance between a wavelength of 600 nm-1000 nm of the at least one optical lens element including the long wavelength filter coating is T60100, and a wavelength of 50% transmittance of at least one of the at least one optical lens element including the long wavelength filter coating and the optical lens assembly in a long wavelength region where wavelength and transmittance are negatively correlated is LWdT5, the following conditions are satisfied: $40 \leq tLs \leq 90$; 4000 nm$<tTk \leq$8000 nm; $85\% \leq T4050$; $T60100 \leq 5\%$; and 500 nm$\leq LWdT5 \leq$600 nm.

According to another aspect of the present disclosure, an imaging apparatus includes the optical lens assembly of the aforementioned aspect and an image sensor disposed on an image surface of the optical lens assembly.

According to another aspect of the present disclosure, an electronic device, which is a mobile device, includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
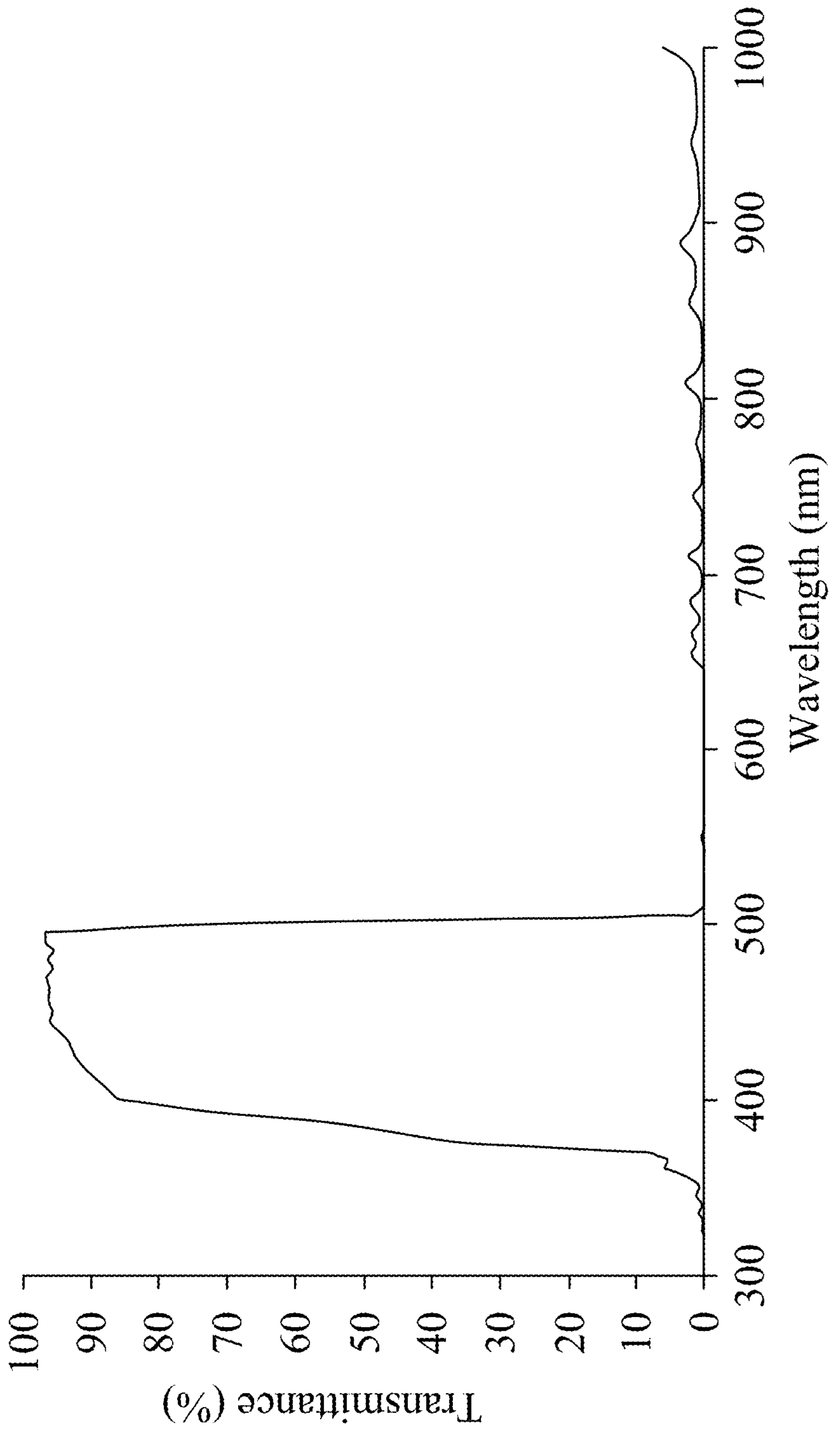
FIG. 1 is a relationship diagram of transmittance and wavelength of the optical lens element according to the 1st example.

According to an aspect of the present disclosure, an optical lens assembly includes at least two optical lens elements or at least three optical lens elements. At least one of the at least two optical lens elements or the at least three optical lens elements includes a long wavelength filter coating, the at least one optical lens element including the long wavelength filter coating is made of a plastic material, the long wavelength filter coating is arranged on an object-side surface or an image-side surface of the at least one optical lens element including the long wavelength filter coating, the long wavelength filter coating includes a plurality of high refractive index coating layers and a plurality of low refractive index coating layers, and the plurality of high refractive index coating layers and the plurality of low refractive index coating layers are stacked in alternations.

When the optical lens assembly includes the at least two optical lens elements, at least one of the at least two optical lens elements includes a long wavelength absorbing material, the at least one optical lens element including the long wavelength absorbing material is made of a plastic material, and the long wavelength absorbing material is evenly mixed with the plastic material.

When a total number of coating layers of the long wavelength filter coating is tLs, the following condition is satisfied: $40 \leq tLs \leq 90$. Through arranging enough number of coating layers, the slope of transmittance can be more vertical, which is favorable for effectively filtering light. Moreover, the following conditions can be satisfied: $42 \leq tLs \leq 80$; $44 \leq tLs \leq 70$; $48 \leq tLs \leq 65$; or $52 \leq tLs \leq 60$.

When a total thickness of coating layers of the long wavelength filter coating is tTk, the following condition is satisfied: 4000 nm<tTk≤10000 nm. Through adjusting suitable thickness of coating layers, it is favorable for maintaining the integrity of the filter coating and avoiding lens deformation. Moreover, the following conditions can be satisfied: 4500 nm≤tTk≤10000 nm; 4700 nm≤tTk≤9000 nm; 5100 nm≤tTk≤8000 nm; 5200 nm≤tTk≤7000 nm; or 5500 nm≤tTk≤6000 nm.

When an average transmittance between a wavelength of 500 nm-600 nm of at least one of the optical lens element including the long wavelength absorbing material and the optical lens element including the long wavelength filter coating is T5060, the following condition is satisfied: 75%≤T5060. Moreover, the following conditions can be satisfied: 85%≤T5060; or 90%≤T5060<100%.

When an average transmittance between a wavelength of 650 nm-1000 nm of at least one of the optical lens element including the long wavelength absorbing material and the optical lens element including the long wavelength filter coating is T65100, the following condition is satisfied: T65100≤5%. Moreover, the following conditions can be satisfied: T65100≤25%; T65100≤20%; T65100≤10%; or 0<T65100≤1%.

When the optical lens assembly includes the at least three optical lens elements, and the total number of coating layers of the long wavelength filter coating is tLs, the following condition is satisfied: $40 \leq tLs \leq 90$. Through arranging enough number of coating layers, the slope of transmittance can be more vertical, which is favorable for effectively filtering light. When a total thickness of coating layers of the long wavelength filter coating is tTk, the following condition is satisfied: 4000 nm<tTk≤8000 nm. Through adjusting suitable thickness of coating layers, it is favorable for maintaining the integrity of the filter coating and avoiding lens deformation.

When an average transmittance between a wavelength of 400 nm-500 nm of the optical lens element including the long wavelength filter coating is T4050, the following condition is satisfied: 85%≤T4050. Through adjusting suitable transmittance, the light transmittance in the short wavelength region can be enhanced, which is favorable for obtaining high recognition rate and good imaging quality. Moreover, the following conditions can be satisfied: 75%≤T4050; or 90%≤T4050<100%.

When an average transmittance between a wavelength of 600 nm-1000 nm of the optical lens element including the long wavelength filter coating is T60100, the following condition is satisfied: T60100≤5%. Moreover, the following conditions can be satisfied: T60100≤10%; T60100≤3%; or 0<T60100≤1%.

When a wavelength of 50% transmittance of at least one of the optical lens element including the long wavelength filter coating and the optical lens assembly in a long wavelength region where wavelength and transmittance are negatively correlated is LWdT5, the following condition is satisfied: 500 nm≤LWdT5≤600 nm. Thus, it is favorable for solving the problem of light leak at large angle, so as to improve imaging quality and improve the accuracy of fingerprint recognition. Moreover, the following conditions can be satisfied: 600 nm≤LWdT5<700 nm; 610 nm≤LWdT5≤660 nm; 620 nm≤LWdT5≤650 nm; 625 nm≤LWdT5≤645 nm; or 630 nm≤LWdT5≤640 nm. Furthermore, the following conditions can be satisfied: 490 nm≤LWdT5≤640 nm; 500 nm≤LWdT5≤630 nm; 520 nm≤LWdT5≤620 nm; 540 nm≤LWdT5≤610 nm; or 550 nm≤LWdT5≤600 nm.

When a curvature radius of a surface of each of the optical lens elements is cR, a horizontal displacement at a maximum effective diameter position of a surface of each of the optical lens elements is cSAG, and a filter coating arranging factor of each of the optical lens elements is Fc, where Fc=LOG (cR/cSAG), the at least one optical lens element including the long wavelength filter coating can satisfy the following condition: 1≤Fc. Thus, it is favorable for improving the technique of coating the surface of the optical lens elements, and the filtering effect can be effectively performed. Moreover, the following conditions can be satisfied: 1.5≤Fc; 2.1≤Fc; 2.5≤Fc; or 3.0≤Fc<∞.

When a refractive index of each of the optical lens elements is aN, the at least one optical lens element including the long wavelength absorbing material can satisfy the following condition: aN≤1.65. Thus, it is favorable for improving the technique of manufacturing the optical lens elements including absorbing material, so as to make the absorbing material be evenly distributed in the optical lens elements. Moreover, the following conditions can be satisfied: aN≤1.57; aN≤1.56; or 1≤aN≤1.55. Furthermore, the following condition can be satisfied: aN≤1.8. A minimum of the refractive indices of the optical lens elements is aNmin.

When an average of a track length ratio of a chief ray in a whole field of view of each of the optical lens elements is aCPavg, the at least one optical lens element including the long wavelength absorbing material can satisfy the following condition: 0.50≤aCPavg≤2.0. Thus, it is favorable for improving the technique of manufacturing the optical lens elements including absorbing material, so as to maintain the absorbing effect and make the absorbing effect same in the whole field of view. Moreover, the following conditions can be satisfied: 0.70≤aCPavg≤1.50; 0.75≤aCPavg≤1.30; 0.80≤aCPavg≤1.20; or 0.90≤aCPavg≤1.10.

When the average of the track length ratio of the chief ray in the whole field of view of each of the optical lens elements is aCPavg, a standard deviation of the track length ratio of the chief ray in the whole field of view of each of the optical lens elements is aCPst, and an absorbing material arranging factor of each of the optical lens elements is Fa, where Fa=LOG(1/(|(aCPavg−1)×aCPst|)), the at least one optical lens element including the long wavelength absorbing material can satisfy the following condition: 1≤Fa. Thus, it is favorable for improving the technique of manufacturing the optical lens elements including absorbing material, and the absorbing effect can be effectively performed. Moreover, the following conditions can be satisfied: 1.5≤Fa; 2.5≤Fa; 2.8≤Fa; 3.1≤Fa; or 3.5≤Fa<∞.

When a maximum of the filter coating arranging factors of the optical lens elements is FcMax, and a maximum of the absorbing material arranging factors of the optical lens elements is FaMax, the following condition can be satisfied: 2≤FcMax×FaMax. Thus, it is favorable for improving the technique of coating the surface of the optical lens elements and the technique of manufacturing the optical lens elements including absorbing material, so as to improve the overall imaging quality of the optical lens assembly. Moreover, the following conditions can be satisfied: 3.5≤FcMax×FaMax; 4≤FcMax×FaMax; 6≤FcMax×FaMax; 8≤FcMax×FaMax; or 10≤FcMax×FaMax<∞.

The at least one optical lens element including the long wavelength absorbing material can be closer to an object side of the optical lens assembly than the at least one optical lens element including the long wavelength filter coating. Thus, a suitable arrangement can be obtained, which is favorable for eliminating light leak at the object side first, reducing the problems of diffusion and difficult control of the reflected light, avoiding problems of light leak and reflection at large angle, so as to enhance the color uniformity.

When the wavelength of 50% transmittance of at least one of the optical lens element including the long wavelength absorbing material, the optical lens element including the long wavelength filter coating and the optical lens assembly in the long wavelength region where wavelength and transmittance are negatively correlated is LWdT5, a difference between LWdT5 of the at least one optical lens element including the long wavelength absorbing material and LWdT5 of the at least one optical lens element including the long wavelength filter coating can be 5 nm-20 nm. Thus, the suitable design and arrangement of absorbing material and filter coating can be obtained, which is favorable for solving the fluorescent problem of the absorbing material and improving the accuracy of fingerprint recognition. Moreover, the following conditions can be satisfied: the difference is 5 nm-15 nm; or the difference is 5 nm-10 nm.

When a tangent slope at 50% transmittance of at least one of the optical lens element including the long wavelength filter coating and the optical lens assembly in the long wavelength region where wavelength and transmittance are negatively correlated is sLWdT5, the following condition can be satisfied: 0.1≤sLWdT5. The tangent slope which is obviously near vertical has high light-filtering effect, which is favorable for reducing the interference problems of light with different wavelengths. Moreover, the following conditions can be satisfied: 0.5≤sLWdT5; 1≤sLWdT5; 5≤sLWdT5; or 10≤sLWdT5<≅. The calculation of sLWdT5 includes the wavelength region of T50, and an absolute value of the slope is calculated.

When an average transmittance between a wavelength of 700 nm-1000 nm of the optical lens element including the long wavelength filter coating is T70100, the following condition can be satisfied: T70100≤10%. Thus, it is favorable for eliminating red light/infrared light with long wavelengths, so as to reduce the interference problems of imaging by the image sensing element. Moreover, the following conditions can be satisfied: T70100≤5%; T70100≤4%; T70100≤3%; T70100≤2%; or 0<T70100≤1%.

When a transmittance at a wavelength of 570 nm of the optical lens element including the long wavelength filter coating is T57, the following condition can be satisfied: T57≤60%. Thus, it is favorable for enhancing the reception efficiency of signals in the short wavelength region, so as to effectively avoid interference. Moreover, the following conditions can be satisfied: 85%≤T57; or 90%≤T57<100%. Further, the following conditions can be satisfied: T57≤50%; or 0<T57≤20%.

When a total thickness of the plurality of high refractive index coating layers of the long wavelength filter coating is HtTk, and a total thickness of the plurality of low refractive index coating layers of the long wavelength filter coating is LtTk, the following condition can be satisfied: 1≤LtTK/HtTK≤3. Thus, the best design and arrangement of thickness can be obtained, which is favorable for enhancing the filtering efficiency of the filter coating. Moreover, the following conditions can be satisfied: 1.1≤LtTK/HtTK≤2.5; 1.2≤LtTK/HtTK≤2.3; 1.3≤LtTK/HtTK≤2.1; or 1.5≤LtTK/HtTK≤1.8.

When the curvature radius of the surface of each of the optical lens elements is CR, a surface of the at least one optical lens element including the long wavelength filter coating can satisfy the following condition: 5≤cR. Thus, it is favorable for improving the technique of coating the surface of the optical lens elements, and reducing the difficulty in coating process. Moreover, the following conditions can be satisfied: 10≤cR; 20≤cR; 50≤cR; or 100≤cR<∞. A minimum of the curvature radii of the surfaces of the optical lens elements is cRmin, and a maximum of the curvature radii of the surfaces of the optical lens elements is cRmax.

When the horizontal displacement at the maximum effective diameter position of the surface of each of the optical lens elements is cSAG, a surface of the at least one optical lens element including the long wavelength filter coating can satisfy the following condition: cSAG≤1. Thus, it is favorable for improving the technique of coating the surface of the optical lens elements, and avoiding significant deviations caused by temperature effects due to excessive surface changes. Moreover, the following conditions can be satisfied: cSAG≤0.8; cSAG≤0.5; cSAG≤0.3; or 0<cSAG≤0.1. A minimum of the horizontal displacements at the maximum effective diameter positions of the surfaces of the optical lens elements is cSAGmin, and a maximum of the horizontal displacements at the maximum effective diameter positions of the surfaces of the optical lens elements is cSAGmax.

The at least one optical lens element including the long wavelength filter coating can be without any inflection point and critical point in an off-axis region thereof, so as to reduce the problems of excessive changes of surface shapes. Thus, it is favorable for obtaining a better and more uniform filtering effect, and preventing the surface shapes of the optical lens elements from being significantly deformed due to the coating process and resulting in a decrease in precision.

The at least one optical lens element including the long wavelength filter coating can be a correcting lens element. High temperature will make the error of the surface shape change of the plastic lens elements become too large. When the number of coating layers increases, the effect of temperature on the surface shape accuracy is more obvious. The lens correcting technology can effectively solve the temperature effect problem as coating the plastic surface, which is favorable for maintaining the integrity of the filter coating and the high precision of the plastic lens elements, so as to obtain an imaging lens with high quality. The lens correcting technology uses methods such as moldflow analysis method, curve fitting function method or wavefront aberration method, which is not limited thereto. The moldflow analysis method uses moldflow analysis to find out the three-dimensional contour nodes of the lens element surface which contracts on the Z axis. The three-dimensional contour nodes are converted into an aspherical curve to be compared with the original curve. At the same time, the correction value is calculated by considering the shrinkage rate of the material and the deformation trend of surface shape. The curve fitting function method is to measure the contour deviation of the element surface, and the fitting curve approaches to the measuring point to obtain the correction value by curve-fitting with a function and then by an optimization algorithm. The function can be exponential or polynomial, and the optimization algorithm can be Gauss Newton algorithm, simplex algorithm or steepest descent method. The wavefront aberration method is to measure the wavefront aberration (imaging aberration) data of the optical system with an interferometer. The wavefront aberration generated during manufacturing and assembling is comprehensively analyzed with the wavefront aberration of the original design value, and the correction value is obtained after optimized with optical software.

When an average transmittance between a wavelength of 400 nm-600 nm of at least one of the optical lens element including the long wavelength absorbing material and the optical lens element including the long wavelength filter coating is T4060, the following conditions can be satisfied: 75%≤T4060; 85%≤T4060; or 90%≤T4060<100%.

When an average transmittance between a wavelength of 430 nm-500 nm of at least one of the optical lens element including the long wavelength absorbing material and the optical lens element including the long wavelength filter coating is T4350, the following conditions can be satisfied: 75%≤T4350; 85%≤T4350; or 90%≤T4350<100%.

When an average transmittance between a wavelength of 450 nm-550 nm of at least one of the optical lens element including the long wavelength absorbing material and the optical lens element including the long wavelength filter coating is T4555, the following conditions can be satisfied: 75%≤T4555; 85%≤T4555; or 90%≤T4555<100%.

When a transmittance at a wavelength of 500 nm of at least one of the optical lens element including the long wavelength absorbing material and the optical lens element including the long wavelength filter coating is T50, the following conditions can be satisfied: 75%≤T50; 85%≤T50; or 90%≤T50<100%.

When a transmittance at a wavelength of 550 nm of at least one of the optical lens element including the long wavelength absorbing material and the optical lens element including the long wavelength filter coating is T55, the following conditions can be satisfied: T55≤60%; or 0<T55≤30%. Moreover, the following conditions can be satisfied: 85%≤T55; or 90%≤T55<100%.

When a transmittance at a wavelength of 600 nm of at least one of the optical lens element including the long wavelength absorbing material and the optical lens element including the long wavelength filter coating is T60, the following conditions can be satisfied: T60≤50%; or 0<T60≤10%. Moreover, the following conditions can be satisfied: 85%≤T60; or 90%≤T60<100%.

When a transmittance at a wavelength of 630 nm of at least one of the optical lens element including the long wavelength absorbing material and the optical lens element including the long wavelength filter coating is T63, the following conditions can be satisfied: T63≤40%; or 0<T63≤10%. Moreover, the following conditions can be satisfied: 40%≤T63≤70%; or 50%≤T63≤60%.

When a transmittance at a wavelength of 640 nm of at least one of the optical lens element including the long wavelength absorbing material and the optical lens element including the long wavelength filter coating is T64, the following conditions can be satisfied: T64≤30%; or 0<T64≤10%. Moreover, the following conditions can be satisfied: 40%≤T64≤70%; or 50%≤T64≤60%.

When a transmittance at a wavelength of 660 nm of at least one of the optical lens element including the long wavelength absorbing material and the optical lens element including the long wavelength filter coating is T66, the following conditions can be satisfied: T66≤20%; or 0<T66≤10%. Moreover, the following conditions can be satisfied: 20%≤T66≤60%; or 30%≤T66≤50%.

When a transmittance at a wavelength of 690 nm of at least one of the optical lens element including the long wavelength absorbing material and the optical lens element including the long wavelength filter coating is T69, the following conditions can be satisfied: $T69 \leq 25\%$; $T69 \leq 20\%$; $T69 \leq 10\%$; $T69 \leq 5\%$; or $0 < T69 \leq 1\%$.

When a transmittance at a wavelength of 710 nm of at least one of the optical lens element including the long wavelength absorbing material and the optical lens element including the long wavelength filter coating is T71, the following conditions can be satisfied: $T71 \leq 25\%$; $T71 \leq 20\%$; $T71 \leq 10\%$; $T71 \leq 5\%$; or $0 < T71 \leq 1\%$.

When the total thickness of the plurality of high refractive index coating layers of the long wavelength filter coating is HtTk, the following conditions can be satisfied: 1000 nm≤HtTK≤3000 nm; 1300 nm≤HtTK≤2800 nm; 1600 nm≤HtTK≤2700 nm; 1800 nm≤HtTK≤2500 nm; or 2000 nm≤HtTK≤2300 nm.

When the total thickness of the plurality of low refractive index coating layers of the long wavelength filter coating is LtTk, the following conditions can be satisfied: 2000 nm≤LtTK≤7000 nm; 2500 nm≤LtTK≤6500 nm; 2800 nm≤LtTK≤6000 nm; 3000 nm≤LtTK≤5500 nm; or 3100 nm≤LtTK≤4000 nm.

The wavelength of 50% transmittance of at least one of the optical lens element including the long wavelength absorbing material, the optical lens element including the long wavelength filter coating and the optical lens assembly in the long wavelength region where wavelength and transmittance are negatively correlated is LWdT5. LWdT5 can be 580 nm if an LA1 long wavelength absorbing material is added into the optical lens element. LWdT5 can be 600 nm if an LA2 long wavelength absorbing material is added into the optical lens element. LWdT5 can be 630 nm if an LA3 long wavelength absorbing material is added into the optical lens element. LWdT5 can be 635 nm if an LA4 long wavelength absorbing material is added into the optical lens element. LWdT5 can be 640 nm if an LA5 long wavelength absorbing material is added into the optical lens element. LWdT5 can be 670 nm if an LA6 long wavelength absorbing material is added into the optical lens element. LWdT5 can be 685 nm if an LA7 long wavelength absorbing material is added into the optical lens element.

A wavelength of 50% transmittance of at least one of the optical lens element including the long wavelength absorbing material, the optical lens element including the long wavelength filter coating and the optical lens assembly in the short wavelength region where wavelength and transmittance are positively correlated is SWuT5. SWuT5 can be 340 nm-350 nm if an SA1 short wavelength absorbing material is added into the optical lens element. SWuT5 can be 390 nm-400 nm if an SA2 short wavelength absorbing material is added into the optical lens element. SWuT5 can be 420 nm-430 nm if an SA3 short wavelength absorbing material is added into the optical lens element. SWuT5 can be 430 nm-440 nm if an SA4 short wavelength absorbing material is added into the optical lens element. SWuT5 can be 430 nm-440 nm if an SA5 short wavelength absorbing material is added into the optical lens element. SWuT5 can be 440 nm-450 nm if an SA6 short wavelength absorbing material is added into the optical lens element. SWuT5 can be 440 nm-450 nm if an SA7 short wavelength absorbing material is added into the optical lens element.

When a central thickness of each of the optical lens elements is aCT, the at least one optical lens element including the long wavelength absorbing material can satisfy the following conditions: $0 < aCT \leq 2.5$; $0 < aCT \leq 1.5$; or $0.1 \leq aCT \leq 1.1$.

When the standard deviation of the track length ratio of the chief ray in the whole field of view of each of the optical lens elements is aCPst, the at least one optical lens element including the long wavelength absorbing material can satisfy the following conditions: $aCPst \leq 0.6$; $aCPst \leq 0.3$; $aCPst \leq 0.1$; $aCPst \leq 0.05$; or $0 < aCPst \leq 0.025$. A minimum of the standard deviations of the track length ratios of the chief ray in the whole fields of view of the optical lens elements is aCPst-Min.

The method of calculating the average and standard deviation of the track length ratio of the chief ray in the whole field of view in the present disclosure is as follows. The field of view from the center (0F) to the maximum image height (1.0F) is divided into 51 equal parts. The ratio between the track length of the chief ray and the central thickness in every part of field of view is calculated, and then the average and standard deviation of the track length ratio of the chief ray in the aforementioned field of view are calculated.

The long wavelength filter coating is a reflective coating (interference effect). A plurality of films is deposited on the surface of plastic materials to form the long wavelength filter coating. Physical vapor deposition can be adopted, such as evaporative deposition or sputtering deposition, or chemical vapor deposition can be adopted, such as ultra-high vacuum chemical vapor deposition, microwave plasma-enhanced chemical vapor deposition or plasma-enhanced chemical vapor deposition.

The high refractive index material used in the long wavelength filter coating of the present disclosure has a refractive index greater than 2.0, which is preferably $TiO_2$ (Nh=2.37), and becomes the initial layer that is the closest to the plastic surface in the alternately arranged structure. The low refractive index material used in the long wavelength filter coating has a refractive index smaller than 1.6, which is preferably $SiO_2$ (Nl=1.46), and becomes the final layer on the plastic surface in the alternately arranged structure. Through having the interference coating with alternate high refractive indices and low refractive indices on the surface of the plastic lens elements, and through coating on the lens element surface with the most appropriate filter coating arranging factor (Fc), it is favorable for obtaining better coating uniformity and making the filtering effect same in the whole field of view.

According to the present disclosure, absorbing material is added to the plastic lens elements, and is added to the lens elements with the most appropriate absorbing material arranging factor (Fa), so as to obtain the lens elements with better absorbing uniformity and ensure the color uniformity in the whole field of view.

According to the present disclosure, the long wavelength absorbing lens element is added to the optical lens assembly, so as to enhance the color uniformity (R/G) ratio and obtain excellent imaging quality. The long wavelength absorbing lens element works in an absorption manner. The long wavelength absorbing material is mixed with the plastic material of the lens element and evenly distributed therein. The absorbing material must be able to withstand the high temperature during the injection molding process without pyrolysis, so as to maintain the desired long wavelength absorbing effect.

According to the present disclosure, the short wavelength absorbing lens element is added to the optical lens assembly, so as to enhance the color uniformity (B/G) ratio, effectively eliminate the image defect of purple fringing and improve imaging quality. The short wavelength absorbing lens element works in an absorption manner. The short wavelength absorbing material is mixed with the plastic material of the lens element and evenly distributed therein. The absorbing material must be able to withstand the high temperature during the injection molding process without pyrolysis, so as to maintain the desired short wavelength absorbing effect. Moreover, the short wavelength absorbing material can enhance the environmental resistance of the plastic lens elements.

The long wavelength region defined in the present disclosure is the region having a wavelength above 500 nm, and the short wavelength region is the region having a wavelength below 500 nm. Positive correlation means that when the wavelength increases, the transmittance tends to increase. Negative correlation means that when the wavelength increases, the transmittance tends to decrease.

The configuration of the filter coating, long wavelength absorption and short wavelength absorption of the present disclosure is comprehensively evaluated with the parameters such as Fc, Fa, and aN. The best design is made based on the coating evaluation and the absorbing evaluation.

The data, such as transmittance, of the present disclosure can be the data of a single lens element, or can be the data of the lens assembly made up of the lens elements if the absorbing lens element and the coated lens element are different lens elements. When there are at least two lens elements respectively having coating or absorbing materials in the optical lens assembly, the relevant values of transmittance of the lens elements all meets the limitation ranges. For example, the 1st example to the 9th example of the present disclosure are the transmittance data of the lens elements, and the 10th example is the transmittance data of the optical lens assembly made up of the lens elements. The transmittance data at different angles is compared based on the incident angle at the surface of incident light being zero degrees.

Through mixing the long wavelength absorbing materials or the short wavelength absorbing materials with the plastic material of the most suitable lens element, the long wavelength absorbing materials can solve the problem of light leak at large angle, improve the imaging quality and cut back the arrangement of blue glass elements, and the short wavelength absorbing materials can enhance the durability of lens elements and the imaging quality. Through further arranging the long wavelength filter coating on the most suitable surface of the lens elements, the arrangement of conventional infrared planar elements can be cut back, so as to obtain the optical lens assembly without the aforementioned two elements, which has the advantages of reducing the number of elements, preventing elements from breaking, miniaturizing the optical lens assembly, enhancing the durability of optical lens assembly, improving the imaging quality and reducing cost.

Furthermore, through further arranging the long wavelength filter coating on the most suitable surface of the lens elements, the sensing region of visible light of the image sensing element can be reduced, and the specific long wavelength light can be filtered out to effectively eliminate red light and infrared light. Thus, the reception efficiency of signals in the short wavelength region can be enhanced to effectively avoid interference, and the accuracy of the fingerprint recognition lens assembly under the screen can be improved. The present disclosure can further include the absorbing lens elements to enhance the durability of lens elements and the imaging quality, and further improve the recognition accuracy.

The long wavelength filter coating of the present disclosure can be additionally coated on the surfaces of other elements, such as a cover board, a cover glass, a plastic board, a glass board or a reflective element. A complete filtering effect is obtained after the long wavelength filter coating on other element surface completes the insufficient wavelength region. Therefore, the coating on the surface of the optical lens elements can be used for filtering out the specific wavelength region to reduce the number of coating layers and thickness. After arranging the optical lens elements with absorbing materials, a complete desired filtering effect is achieved by combining the respective filtering effects of the multiple elements.

According to another aspect of the present disclosure, an imaging apparatus includes the aforementioned optical lens assembly and an image sensor disposed on an image surface of the optical lens assembly.

According to one another aspect of the present disclosure, an electronic device, which is a mobile device, includes the aforementioned imaging apparatus.

According to the above description of the present disclosure, the following specific examples and embodiments are provided for further explanation.

The optical lens assemblies of the 1st embodiment to the 7th embodiment are provided as follows. "00" in the column of "coating evaluation" means the most suitable surface of the optical lens elements for arranging the filter coating, which satisfies the following condition: $Fc \geq 1.5$, and "o" therein means the second suitable surface of the optical lens elements for arranging the filter coating, which satisfies the following condition: $Fc \geq 1$. "oo" in the column of "absorbing evaluation" means the most suitable optical lens element for adding the absorbing materials, which satisfies the following conditions: $Fa \geq 2.5$ and $aN \leq 1.65$, and "o" therein means the second suitable optical lens element for adding the absorbing materials, which satisfies the following condition: $aN \leq 1.65$.

1st Embodiment

The optical lens assembly according to the 1st embodiment includes three optical lens elements, which are an optical lens element L1, an optical lens element L2 and an optical lens element L3. The optical lens element L1 includes two surfaces R1 and R2, the optical lens element L2 includes two surfaces R3 and R4, and the optical lens element L3 includes two surfaces R5 and R6.

In the optical lens assembly of the 1st embodiment, when a curvature radius of a surface of each of the three optical lens elements is cR, the following condition can be satisfied: $5 \leq cR$. When a horizontal displacement at a maximum effective diameter position of a surface of each of the three optical lens elements is cSAG, the following condition can be satisfied: $cSAG \leq 1$. When a filter coating arranging factor of each of the three optical lens elements is Fc, where $Fc = LOG(cR/cSAG)$, the following condition can be satisfied: $1 \leq Fc$.

In the optical lens assembly of the 1st embodiment, when a refractive index of each of the three optical lens elements is aN, the following condition can be satisfied: $aN \leq 1.65$. When a central thickness of each of the three optical lens elements is aCT, the following condition can be satisfied: $0.1 \leq aCT \leq 1.1$. When an average of a track length ratio of a chief ray in a whole field of view of each of the three optical lens elements is aCPavg, the following condition can be satisfied: $0.50 \leq aCPavg \leq 2.0$. When a standard deviation of the track length ratio of the chief ray in the whole field of view of each of the three optical lens elements is aCPst, the following condition can be satisfied: $aCPst \leq 0.6$. When an absorbing material arranging factor of each of the three optical lens elements is Fa, where Fa=LOG(1/(|(aCPavg−1)×aCPst|)), the following condition can be satisfied: 1≤Fa.

The values of various parameters of the optical lens element L1, the optical lens element L2 and the optical lens element L3 are shown in Table 1 below.

TABLE 1

| 1st Embodiment | | | | | | |
|---|---|---|---|---|---|---|
| | cR (mm) | | cSAG (mm) | | Fc | Coating Evaluation |
| L1 | \|R1\| | 1.37 | \|SAG1R1\| | 0.15 | 0.96 | |
| | \|R2\| | 0.58 | \|SAG1R2\| | 0.42 | 0.14 | |
| L2 | \|R3\| | 0.72 | \|SAG2R1\| | 0.04 | 1.29 | ○ |
| | \|R4\| | 1.44 | \|SAG2R2\| | 0.03 | 1.76 | ○○ |
| L3 | \|R5\| | 0.89 | \|SAG3R1\| | 0.09 | 1.02 | |
| | \|R6\| | 0.43 | \|SAG3R2\| | 0.16 | 0.44 | |
| | cR min | cRmax | cSAGmin | cSAG max | FcMax | |
| | 0.43 | 1.44 | 0.03 | 0.42 | 1.76 | |
| | aN | aCT (mm) | aCPavg (mm) | aCPst (mm) | Fa | Absorbing Evaluation |
| L1 | 1.54 | 0.30 | 1.66 | 0.53 | 0.45 | ○ |
| L2 | 1.54 | 0.19 | 1.01 | 0.01 | 3.88 | ○○ |
| L3 | 1.54 | 0.43 | 0.96 | 0.04 | 2.85 | ○○ |
| | aN min | | | aCPst Min | FaMax | |
| | 1.54 | | | 0.01 | 3.88 | |
| | | | | | FcMax*FaMax | |
| | | | | | 6.83 | |

From Table 1, a filter coating arranging factor Fc of the surface R4 of the optical lens element L2 is 1.76, which is the most suitable surface of the optical lens elements for arranging the filter coating. A filter coating arranging factor Fc of the surface R3 of the optical lens element L2 is 1.29, which is the second suitable surface of the optical lens elements for arranging the filter coating. Absorbing material arranging factors Fa of the optical lens element L2 and the optical lens element L3 are 3.88 and 2.85, respectively, and refractive indices aN thereof are both 1.54, which are the most suitable optical lens elements for adding the absorbing materials. A refractive index aN of the optical lens element L1 is 1.54, which is the second suitable optical lens element for adding the absorbing materials.

2nd Embodiment

The optical lens assembly according to the 2nd embodiment includes four optical lens elements, which are an optical lens element L1, an optical lens element L2, an optical lens element L3 and an optical lens element L4. The optical lens element L1 includes two surfaces R1 and R2, the optical lens element L2 includes two surfaces R3 and R4, the optical lens element L3 includes two surfaces R5 and R6, and the optical lens element L4 includes two surfaces R7 and R8. The definitions of these parameters shown in the following table are the same as those stated in the 1st embodiment with corresponding values for the 2nd embodiment, so an explanation in this regard will not be provided again. The values of various parameters of the optical lens element L1, the optical lens element L2, the optical lens element L3 and the optical lens element L4 are shown in Table 2 below.

TABLE 2

| 2nd Embodiment | | | | | | |
|---|---|---|---|---|---|---|
| | cR (mm) | | cSAG (mm) | | Fc | Coating Evaluation |
| L1 | \|R1\| | 2.82 | \|SAG1R1\| | 0.10 | 1.44 | ○ |
| | \|R2\| | 11.15 | \|SAG1R2\| | 0.11 | 2.03 | ○○ |
| L2 | \|R3\| | 2.07 | \|SAG2R1\| | 0.15 | 1.13 | |
| | \|R4\| | 2.65 | \|SAG2R2\| | 0.13 | 1.32 | ○ |
| L3 | \|R5\| | 1.51 | \|SAG3R1\| | 0.18 | 0.92 | |
| | \|R6\| | 1.03 | \|SAG3R2\| | 0.51 | 0.31 | |
| L4 | \|R7\| | 1.03 | \|SAG4R1\| | 0.14 | 0.86 | |
| | \|R8\| | 0.75 | \|SAG4R2\| | 0.30 | 0.39 | |
| | cR min | cRmax | cSAGmin | cSAG max | FcMax | |
| | 0.75 | 11.15 | 0.10 | 0.51 | 2.03 | |
| | aN | aCT (mm) | aCPavg (mm) | aCPst (mm) | Fa | Absorbing Evaluation |
| L1 | 1.64 | 0.93 | 1.03 | 0.03 | 3.00 | ○ |
| L2 | 1.64 | 0.37 | 1.07 | 0.07 | 2.33 | |
| L3 | 1.64 | 0.57 | 0.77 | 0.18 | 1.38 | |
| L4 | 1.64 | 0.44 | 1.21 | 0.19 | 1.40 | |
| | aN min | | | aCPst Min | FaMax | |
| | 1.64 | | | 0.03 | 3.00 | |
| | | | | | FcMax*FaMax | |
| | | | | | 6.08 | |

From Table 2, a filter coating arranging factor Fc of the surface R2 of the optical lens element L1 is 2.03, which is the most suitable surface of the optical lens elements for arranging the filter coating. Filter coating arranging factors Fc of the surface R1 of the optical lens element L1 and the surface R4 of the optical lens element L2 are 1.44 and 1.32, respectively, which are the second suitable surfaces of the optical lens elements for arranging the filter coating. An absorbing material arranging factor Fa of the optical lens element L1 is 3.00, which is the second suitable optical lens element for adding the absorbing materials.

3rd Embodiment

The optical lens assembly according to the 3rd embodiment includes five optical lens elements, which are an optical lens element L1, an optical lens element L2, an optical lens element L3, an optical lens element L4 and an optical lens element L5. The optical lens element L1 includes two surfaces R1 and R2, the optical lens element L2 includes two surfaces R3 and R4, the optical lens element L3 includes two surfaces R5 and R6, the optical lens element L4 includes two surfaces R7 and R8, and the optical lens element L5 includes two surfaces R9 and R10. The definitions of these parameters shown in the following table are the same as those stated in the 1st embodiment with corresponding values for the 3rd embodiment, so an explanation in this regard will not be provided again. The values of various parameters of the optical lens element L1, the optical lens element L2, the optical lens element L3, the optical lens element L4 and the optical lens element L5 are shown in Table 3 below.

TABLE 3

| 3rd Embodiment | | | | | | |
|---|---|---|---|---|---|---|
| | cR (mm) | | cSAG (mm) | | Fc | Coating Evaluation |
| L1 | \|R1\| | 3.89 | \|SAG1R1\| | 0.81 | 0.68 | |
| | \|R2\| | 40.34 | \|SAG1R2\| | 0.08 | 2.69 | ○○ |
| L2 | \|R3\| | 16.69 | \|SAG2R1\| | 0.12 | 2.13 | ○ |
| | \|R4\| | 4.11 | \|SAG2R2\| | 0.38 | 1.04 | |
| L3 | \|R5\| | 9.18 | \|SAG3R1\| | 0.21 | 1.64 | |
| | \|R6\| | 17.11 | \|SAG3R2\| | 0.12 | 2.15 | ○ |
| L4 | \|R7\| | 6.85 | \|SAG4R1\| | 0.22 | 1.50 | |
| | \|R8\| | 4.90 | \|SAG4R2\| | 0.35 | 1.15 | |
| L5 | \|R9\| | 20.90 | \|SAG5R1\| | 0.25 | 1.92 | |
| | \|R10\| | 6.06 | \|SAG5R2\| | 0.05 | 2.09 | ○ |
| | cR min | cRmax | cSAGmin | cSAG max | FcMax | |
| | 3.89 | 40.34 | 0.05 | 0.81 | 2.69 | |
| | aN | aCT (mm) | aCPavg (mm) | aCPst (mm) | Fa | Absorbing Evaluation |
| L1 | 1.54 | 2.17 | 0.99 | 0.01 | 4.33 | ○○ |
| L2 | 1.64 | 0.82 | 1.01 | 0.01 | 4.13 | |
| L3 | 1.53 | 0.42 | 1.01 | 0.01 | 4.19 | ○ |
| L4 | 1.67 | 0.47 | 0.98 | 0.01 | 3.61 | |
| L5 | 1.54 | 0.62 | 1.05 | 0.04 | 2.70 | ○○ |
| | aN min | | | aCPst Min | FaMax | |
| | 1.53 | | | 0.01 | 4.33 | |
| | | | | | FcMax*FaMax | |
| | | | | | 11.63 | |

From Table 3, a filter coating arranging factor Fc of the surface R2 of the optical lens element L1 is 2.69, which is the most suitable surface of the optical lens elements for arranging the filter coating. Filter coating arranging factors Fc of the surface R3 of the optical lens element L2, the surface R6 of the optical lens element L3 and the surface R10 of the optical lens element L5 are 2.13, 2.15 and 2.09, respectively, which are the second suitable surfaces of the optical lens elements for arranging the filter coating. Absorbing material arranging factors Fa of the optical lens element L1 and the optical lens element L5 are 4.33 and 2.70, respectively, and refractive indices aN thereof are both 1.54, which are the most suitable optical lens elements for adding the absorbing materials. An absorbing material arranging factor Fa of the optical lens element L3 is 4.19, and a refractive index aN thereof is 1.53, which is the second suitable optical lens element for adding the absorbing materials.

4th Embodiment

The optical lens assembly according to the 4th embodiment includes six optical lens elements, which are an optical lens element L1, an optical lens element L2, an optical lens element L3, an optical lens element L4, an optical lens element L5 and an optical lens element L6. The optical lens element L1 includes two surfaces R1 and R2, the optical lens element L2 includes two surfaces R3 and R4, the optical lens element L3 includes two surfaces R5 and R6, the optical lens element L4 includes two surfaces R7 and R8, the optical lens element L5 includes two surfaces R9 and R10, and the optical lens element L6 includes two surfaces R11 and R12. The definitions of these parameters shown in the following table are the same as those stated in the 1st embodiment with corresponding values for the 4th embodiment, so an explanation in this regard will not be provided again. The values of various parameters of the optical lens element L1, the optical lens element L2, the optical lens element L3, the optical lens element L4, the optical lens element L5 and the optical lens element L6 are shown in Table 4 below.

TABLE 4

| 4th Embodiment | | | | | | |
|---|---|---|---|---|---|---|
| | cR (mm) | | cSAG (mm) | | Fc | Coating Evaluation |
| L1 | \|R1\| | 3.57 | \|SAG1R1\| | 0.03 | 2.08 | ○ |
| | \|R2\| | 8.03 | \|SAG1R2\| | 0.07 | 2.05 | ○ |
| L2 | \|R3\| | 4.44 | \|SAG2R1\| | 0.07 | 1.78 | |
| | \|R4\| | 3.94 | \|SAG2R2\| | 0.13 | 1.47 | |
| L3 | \|R5\| | 196.08 | \|SAG3R1\| | 0.24 | 2.91 | ○○ |
| | \|R6\| | 5.66 | \|SAG3R2\| | 0.15 | 1.58 | |
| L4 | \|R7\| | 2.77 | \|SAG4R1\| | 0.18 | 1.19 | |
| | \|R8\| | 0.70 | \|SAG4R2\| | 0.67 | 0.02 | |
| L5 | \|R9\| | 3.81 | \|SAG5R1\| | 0.12 | 1.49 | |
| | \|R10\| | 10.25 | \|SAG5R2\| | 0.04 | 2.47 | ○ |
| L6 | \|R11\| | 1.28 | \|SAG6R1\| | 0.02 | 1.77 | |
| | \|R12\| | 0.62 | \|SAG6R2\| | 0.19 | 0.50 | |
| | cR min | cRmax | cSAGmin | cSAG max | FcMax | |
| | 0.62 | 196.08 | 0.02 | 0.67 | 2.91 | |
| | aN | aCT (mm) | aCPavg (mm) | aCPst (mm) | Fa | Absorbing Evaluation |
| L1 | 1.54 | 0.47 | 1.06 | 0.04 | 2.58 | ○○ |
| L2 | 1.54 | 0.34 | 1.06 | 0.04 | 2.59 | ○○ |
| L3 | 1.69 | 0.24 | 1.17 | 0.12 | 1.69 | |
| L4 | 1.54 | 0.78 | 0.70 | 0.18 | 1.26 | ○ |
| L5 | 1.69 | 0.32 | 1.20 | 0.16 | 1.49 | |
| L6 | 1.53 | 0.40 | 1.52 | 0.37 | 0.71 | |
| | aN min | | | aCPst Min | FaMax | |
| | 1.53 | | | 0.04 | 2.59 | |
| | | | | | FcMax*FaMax | |
| | | | | | 7.54 | |

From Table 4, a filter coating arranging factor Fc of the surface R5 of the optical lens element L3 is 2.91, which is the most suitable surface of the optical lens elements for arranging the filter coating. Filter coating arranging factors Fc of the surface R1 of the optical lens element L1, the surface R2 of the optical lens element L1 and the surface R10 of the optical lens element L5 are 2.08, 2.05 and 2.47, respectively, which are the second suitable surfaces of the optical lens elements for arranging the filter coating. Absorbing material arranging factors Fa of the optical lens element L1 and the optical lens element L2 are 2.58 and 2.59, respectively, and refractive indices aN thereof are both 1.54, which are the most suitable optical lens elements for adding the absorbing materials. A refractive index aN of the optical lens element L4 is 1.54, which is the second suitable optical lens element for adding the absorbing materials.

5th Embodiment

The optical lens assembly according to the 5th embodiment includes seven optical lens elements, which are an optical lens element L1, an optical lens element L2, an optical lens element L3, an optical lens element L4, an optical lens element L5, an optical lens element L6 and an optical lens element L7. The optical lens element L1 includes two surfaces R1 and R2, the optical lens element L2 includes two surfaces R3 and R4, the optical lens element L3 includes two surfaces R5 and R6, the optical lens element L4 includes two surfaces R7 and R8, the optical lens element L5 includes two surfaces R9 and R10, the optical lens element L6 includes two surfaces R11 and R12, and the optical lens element L7 includes two surfaces R13 and R14. The definitions of these parameters shown in the following table are the same as those stated in the 1st embodiment with corresponding values for the 5th embodiment, so an explanation in this regard will not be provided again. The values of various parameters of the optical lens element L1, the optical lens element L2, the optical lens element L3, the optical lens element L4, the optical lens element L5, the optical lens element L6 and the optical lens element L7 are shown in Table 5 below.

TABLE 5

5th Embodiment

| | cR (mm) | | cSAG (mm) | | Fc | Coating Evaluation |
|---|---|---|---|---|---|---|
| L1 | \|R1\| | 2.33 | \|SAG1R1\| | 0.73 | 0.50 | |
| | \|R2\| | 9.49 | \|SAG1R2\| | 0.12 | 1.91 | |
| L2 | \|R3\| | 18.03 | \|SAG2R1\| | 0.15 | 2.09 | |
| | \|R4\| | 6.58 | \|SAG2R2\| | 0.23 | 1.46 | |
| L3 | \|R5\| | 68.93 | \|SAG3R1\| | 0.10 | 2.82 | ○ |
| | \|R6\| | 17.84 | \|SAG3R2\| | 0.07 | 2.41 | ○ |
| L4 | \|R7\| | 75.79 | \|SAG4R1\| | 0.05 | 3.23 | ○○ |
| | \|R8\| | 13.22 | \|SAG4R2\| | 0.26 | 1.70 | |
| L5 | \|R9\| | 246.28 | \|SAG5R1\| | 0.69 | 2.56 | ○ |
| | \|R10\| | 83.51 | \|SAG5R2\| | 0.65 | 2.11 | ○ |
| L6 | \|R11\| | 2.76 | \|SAG6R1\| | 0.84 | 0.52 | |
| | \|R12\| | 3.57 | \|SAG6R2\| | 0.98 | 0.56 | |
| L7 | \|R13\| | 6.47 | \|SAG7R1\| | 1.37 | 0.67 | |
| | \|R14\| | 7.08 | \|SAG7R2\| | 1.66 | 0.63 | |

| cR min | cRmax | cSAGmin | cSAG max | FcMax |
|---|---|---|---|---|
| 2.33 | 246.28 | 0.05 | 1.66 | 3.23 |

| | aN | aCT (mm) | aCPavg (mm) | aCPst (mm) | Fa | Absorbing Evaluation |
|---|---|---|---|---|---|---|
| L1 | 1.55 | 0.93 | 1.03 | 0.03 | 3.03 | ○ |
| L2 | 1.67 | 0.30 | 1.06 | 0.05 | 2.53 | |
| L3 | 1.67 | 0.31 | 1.07 | 0.06 | 2.37 | |
| L4 | 1.54 | 0.57 | 1.00 | 0.02 | 4.44 | ○○ |
| L5 | 1.57 | 0.42 | 1.00 | 0.06 | 4.74 | |
| L6 | 1.54 | 0.54 | 1.05 | 0.09 | 2.34 | ○○ |
| L7 | 1.53 | 0.82 | 1.40 | 0.26 | 0.98 | |

| aN min | aCPst Min | FaMax |
|---|---|---|
| 1.53 | 0.02 | 4.74 |

| FcMax*FaMax |
|---|
| 15.28 |

From Table 5, a filter coating arranging factor Fc of the surface R7 of the optical lens element L4 is 3.23, which is the most suitable surface of the optical lens elements for arranging the filter coating. Filter coating arranging factors Fc of the surface R5 of the optical lens element L3, the surface R6 of the optical lens element L3, the surface R9 of the optical lens element L5 and the surface R10 of the optical lens element L5 are 2.82, 2.41, 2.56 and 2.11, respectively, which are the second suitable surfaces of the optical lens elements for arranging the filter coating. Absorbing material arranging factors Fa of the optical lens element L4 and the optical lens element L6 are 4.44 and 2.34, respectively, and refractive indices aN thereof are both 1.54, which are the most suitable optical lens elements for adding the absorbing materials. An absorbing material arranging factors Fa of the optical lens element L1 is 3.03, and a refractive index aN thereof is 1.55, which is the second suitable optical lens element for adding the absorbing materials.

6th Embodiment

The optical lens assembly according to the 6th embodiment includes eight optical lens elements, which are an optical lens element L1, an optical lens element L2, an optical lens element L3, an optical lens element L4, an optical lens element L5, an optical lens element L6, an optical lens element L7 and an optical lens element L8. The optical lens element L1 includes two surfaces R1 and R2, the optical lens element L2 includes two surfaces R3 and R4, the optical lens element L3 includes two surfaces R5 and R6, the optical lens element L4 includes two surfaces R7 and R8, the optical lens element L5 includes two surfaces R9 and R10, the optical lens element L6 includes two surfaces R11 and R12, the optical lens element L7 includes two surfaces R13 and R14, and the optical lens element L8 includes two surfaces R15 and R16. The definitions of these parameters shown in the following table are the same as those stated in the 1st embodiment with corresponding values for the 6th embodiment, so an explanation in this regard will not be provided again. The values of various parameters of the optical lens element L1, the optical lens element L2, the optical lens element L3, the optical lens element L4, the optical lens element L5, the optical lens element L6, the optical lens element L7 and the optical lens element L8 are shown in Table 6 below.

TABLE 6

6th Embodiment

| | cR (mm) | | cSAG (mm) | | Fc | Coating Evaluation |
|---|---|---|---|---|---|---|
| L1 | \|R1\| | 2.96 | \|SAG1R1\| | 0.69 | 0.63 | |
| | \|R2\| | 10.18 | \|SAG1R2\| | 0.13 | 1.88 | |
| L2 | \|R3\| | 10.91 | \|SAG2R1\| | 0.21 | 1.72 | |
| | \|R4\| | 5.76 | \|SAG2R2\| | 0.30 | 1.28 | |
| L3 | \|R5\| | 6.77 | \|SAG3R1\| | 0.11 | 1.81 | ○ |
| | \|R6\| | 6.48 | \|SAG3R2\| | 0.15 | 1.62 | |
| L4 | \|R7\| | 22.80 | \|SAG4R1\| | 0.08 | 2.45 | ○ |
| | \|R8\| | 822.48 | \|SAG4R2\| | 0.29 | 3.46 | ○○ |
| L5 | \|R9\| | 45.38 | \|SAG5R1\| | 0.34 | 2.13 | ○ |
| | \|R10\| | 147.09 | \|SAG5R2\| | 0.44 | 2.53 | ○ |
| L6 | \|R11\| | 5.31 | \|SAG6R1\| | 0.87 | 0.79 | |
| | \|R12\| | 3.63 | \|SAG6R2\| | 0.73 | 0.70 | |
| L7 | \|R13\| | 3.26 | \|SAG7R1\| | 0.73 | 0.65 | |
| | \|R14\| | 11.23 | \|SAG7R2\| | 0.93 | 1.08 | |
| L8 | \|R15\| | 12.02 | \|SAG8R1\| | 1.32 | 0.96 | |
| | \|R16\| | 4.29 | \|SAG8R2\| | 1.33 | 0.51 | |

| cR min | cRmax | cSAGmin | cSAG max | FcMax |
|---|---|---|---|---|
| 2.96 | 822.48 | 0.08 | 1.33 | 3.46 |

| | aN | aCT (mm) | aCPavg (mm) | aCPst (mm) | Fa | Absorbing Evaluation |
|---|---|---|---|---|---|---|
| L1 | 1.54 | 0.95 | 1.04 | 0.03 | 2.94 | ○○ |
| L2 | 1.69 | 0.32 | 1.05 | 0.04 | 2.64 | |

TABLE 6-continued

| 6th Embodiment | | | | | | |
|---|---|---|---|---|---|---|
| L3 | 1.69 | 0.34 | 1.06 | 0.05 | 2.47 | |
| L4 | 1.54 | 0.59 | 1.02 | 0.02 | 3.48 | ○○ |
| L5 | 1.54 | 0.51 | 0.95 | 0.06 | 2.53 | ○○ |
| L6 | 1.57 | 0.46 | 1.13 | 0.15 | 1.72 | |
| L7 | 1.54 | 0.71 | 1.00 | 0.12 | 3.73 | ○○ |
| L8 | 1.53 | 0.65 | 1.73 | 0.43 | 0.50 | |

| aN min | aCPst Min | FaMax |
|---|---|---|
| 1.53 | 0.02 | 3.73 |

| FcMax*FaMax |
|---|
| 12.89 |

From Table 6, a filter coating arranging factor Fc of the surface R8 of the optical lens element L4 is 3.46, which is the most suitable surface of the optical lens elements for arranging the filter coating. Filter coating arranging factors Fc of the surface R5 of the optical lens element L3, the surface R7 of the optical lens element L4, the surface R9 of the optical lens element L5 and the surface R10 of the optical lens element L5 are 1.81, 2.45, 2.13 and 2.53, respectively, which are the second suitable surfaces of the optical lens elements for arranging the filter coating. Absorbing material arranging factors Fa of the optical lens element L1, the optical lens element L4, the optical lens element L5 and the optical lens element L7 are 2.94, 3.48, 2.53 and 3.73, respectively, and refractive indices aN thereof are all 1.54, which are the most suitable optical lens elements for adding the absorbing materials.

7th Embodiment

The optical lens assembly according to the 7th embodiment includes nine optical lens elements, which are an optical lens element L1, an optical lens element L2, an optical lens element L3, an optical lens element L4, an optical lens element L5, an optical lens element L6, an optical lens element L7, an optical lens element L8 and an optical lens element L9. The optical lens element L1 includes two surfaces R1 and R2, the optical lens element L2 includes two surfaces R3 and R4, the optical lens element L3 includes two surfaces R5 and R6, the optical lens element L4 includes two surfaces R7 and R8, the optical lens element L5 includes two surfaces R9 and R10, the optical lens element L6 includes two surfaces R11 and R12, the optical lens element L7 includes two surfaces R13 and R14, the optical lens element L8 includes two surfaces R15 and R16, and the optical lens element L9 includes two surfaces R17 and R18. The definitions of these parameters shown in the following table are the same as those stated in the 1st embodiment with corresponding values for the 7th embodiment, so an explanation in this regard will not be provided again. The values of various parameters of the optical lens element L1, the optical lens element L2, the optical lens element L3, the optical lens element L4, the optical lens element L5, the optical lens element L6, the optical lens element L7, the optical lens element L8 and the optical lens element L9 are shown in Table 7 below.

TABLE 7

7th Embodiment

| | cR (mm) | | cSAG (mm) | | Fc | Coating Evaluation |
|---|---|---|---|---|---|---|
| L1 | \|R1\| | 2.79 | \|SAG1R1\| | 0.82 | 0.53 | |
| | \|R2\| | 20.73 | \|SAG1R2\| | 0.09 | 2.36 | ○ |
| L2 | \|R3\| | 15.62 | \|SAG2R1\| | 0.16 | 1.99 | |
| | \|R4\| | 5.03 | \|SAG2R2\| | 0.32 | 1.20 | |
| L3 | \|R5\| | 14.53 | \|SAG3R1\| | 0.03 | 2.75 | ○ |
| | \|R6\| | 11.88 | \|SAG3R2\| | 0.05 | 2.38 | ○ |
| L4 | \|R7\| | 23.50 | \|SAG4R1\| | 0.05 | 2.64 | ○ |
| | \|R8\| | 79.12 | \|SAG4R2\| | 0.09 | 2.93 | ○ |
| L5 | \|R9\| | 198.12 | \|SAG5R1\| | 0.17 | 3.08 | ○○ |
| | \|R10\| | 21.57 | \|SAG5R2\| | 0.27 | 1.90 | |
| L6 | \|R11\| | 11.45 | \|SAG6R1\| | 0.59 | 1.29 | |
| | \|R12\| | 29.04 | \|SAG6R2\| | 0.53 | 1.74 | |
| L7 | \|R13\| | 6.43 | \|SAG7R1\| | 0.71 | 0.95 | |
| | \|R14\| | 7.02 | \|SAG7R2\| | 0.88 | 0.90 | |
| L8 | \|R15\| | 3.20 | \|SAG8R1\| | 1.02 | 0.50 | |
| | \|R16\| | 4.83 | \|SAG8R2\| | 1.24 | 0.59 | |
| L9 | \|R17\| | 9.10 | \|SAG9R1\| | 1.40 | 0.81 | |
| | \|R18\| | 6.26 | \|SAG9R2\| | 1.52 | 0.62 | |

| cR min | cRmax | cSAGmin | cSAG max | FcMax |
|---|---|---|---|---|
| 2.79 | 198.12 | 0.03 | 1.52 | 3.08 |

| | aN | aCT (mm) | aCPavg (mm) | aCPst (mm) | Fa | Absorbing Evaluation |
|---|---|---|---|---|---|---|
| L1 | 1.54 | 1.03 | 1.03 | 0.03 | 3.05 | ○○ |
| L2 | 1.61 | 0.32 | 1.06 | 0.05 | 2.50 | |
| L3 | 1.69 | 0.33 | 1.07 | 0.07 | 2.30 | |
| L4 | 1.54 | 0.47 | 1.03 | 0.02 | 3.11 | ○○ |
| L5 | 1.54 | 0.43 | 1.01 | 0.01 | 3.81 | ○○ |
| L6 | 1.57 | 0.44 | 1.03 | 0.03 | 3.09 | |
| L7 | 1.57 | 0.50 | 1.03 | 0.08 | 2.68 | |
| L8 | 1.54 | 0.69 | 1.02 | 0.03 | 3.33 | ○○ |
| L9 | 1.53 | 0.68 | 1.58 | 0.35 | 0.69 | |

| aN min | aCPst Min | FaMax |
|---|---|---|
| 1.53 | 0.01 | 3.81 |

| FcMax*FaMax |
|---|
| 11.71 |

From Table 7, a filter coating arranging factor Fc of the surface R9 of the optical lens element L5 is 3.08, which is the most suitable surface of the optical lens elements for arranging the filter coating. Filter coating arranging factors Fc of the surface R2 of the optical lens element L1, the surface R5 of the optical lens element L3, the surface R6 of the optical lens element L3, the surface R7 of the optical lens element L4 and the surface R8 of the optical lens element L4 are 2.36, 2.75, 2.38, 2.64 and 2.93, respectively, which are the second suitable surfaces of the optical lens elements for arranging the filter coating. Absorbing material arranging factors Fa of the optical lens element L1, the optical lens element L4, the optical lens element L5 and the optical lens element L8 are 3.05, 3.11, 3.81 and 3.33, respectively, and refractive indices aN thereof are all 1.54, which are the most suitable optical lens elements for adding the absorbing materials.

The optical lens assemblies according to the comparison and the 8th embodiment to the 12th embodiment are provided as Table 8 below. The R/G ratio and B/G ratio of each embodiment are measured to find out the color uniformity of each embodiment. "A" in the following table means that the optical lens element includes absorbing materials, and "C"

in the following table means that the optical lens element includes filtering coating on the surface thereof.

TABLE 8

| Embodiment | Comparison | 8th | 9th | 10th | 11th | 12th |
|---|---|---|---|---|---|---|
| L1 | — | A | — | — | A | C + A |
| L2 | — | C | C | C | — | — |
| L5 | — | — | A | — | — | — |
| L6 | — | — | — | — | C | — |
| Average of all R/G ratios from 0 to 1/2 image height (IMGH) | 0.98 | 0.99 | 1.02 | 0.99 | 0.99 | 0.99 |
| Average of all R/G ratios from 1/2 to maximum image height | 0.92 | 0.86 | 0.98 | 0.85 | 0.82 | 0.88 |
| Average of all R/G ratios from 0 to maximum image height | 0.95 | 0.92 | 1.00 | 0.92 | 0.90 | 0.93 |
| Average of all B/G ratios from 0 to 1/2 image height | 1.02 | 1.02 | 1.02 | 1.02 | 1.02 | 1.02 |
| Average of all B/G ratios from 1/2 to maximum image height | 1.05 | 0.93 | 0.96 | 0.95 | 1.05 | 1.00 |
| Average of all B/G ratios from 0 to maximum image height | 1.04 | 0.97 | 0.99 | 0.98 | 1.03 | 1.01 |

1st Example

The optical lens element according to the 1st example includes a long wavelength filter coating. When a total number of coating layers of the long wavelength filter coating is tLs, a total thickness of coating layers of the long wavelength filter coating is tTk, an average transmittance between a wavelength of 400 nm-500 nm of the optical lens element including the long wavelength filter coating is T4050, an average transmittance between a wavelength of 600 nm-1000 nm of the optical lens element including the long wavelength filter coating is T60100, and a wavelength of 50% transmittance of the optical lens element including the long wavelength filter coating in a long wavelength region where wavelength and transmittance are negatively correlated is LWdT5, the following conditions can be satisfied: $40 \leq tLs \leq 90$; $4000\ nm < tTk \leq 8000\ nm$; $85\% \leq T4050$; $T60100 \leq 5\%$; and $500\ nm \leq LWdT5 \leq 600\ nm$.

Please refer to FIG. 1 and Table 9. FIG. 1 is a relationship diagram of transmittance and wavelength of the optical lens element according to the 1st example. The incident angle of the light that strikes on the optical lens element is 0 degrees, and the transmittances of lights with different wavelengths are listed in Table 9. From FIG. 1 and Table 9, it shows that the optical lens element including the long wavelength filter coating according to the 1st example can effectively filter out long wavelength light, so as to improve imaging quality.

TABLE 9

| 1st Example | | | |
|---|---|---|---|
| LWdT5 (nm) | 500-505 | tLs | 60 |
| sLWdT5 | 14.13 | tTk (nm) | 5625 |
| T4050 (%) | 92.87 | HtTK (nm) | 1799 |
| T4060 (%) | 47.64 | LtTK (nm) | 3826 |
| T4350 (%) | 94.20 | LtTK/HtTK | 2.13 |
| T4555 (%) | 49.40 | | |
| T5060 (%) | 3.60 | | |
| T60100 (%) | 1.11 | | |
| T65100 (%) | 1.26 | | |
| T70100 (%) | 1.27 | | |
| T50 (%) | 72.50 | | |
| T55 (%) | 0.56 | | |
| T57 (%) | 0.01 | | |
| T60 (%) | 0.00 | | |
| T63 (%) | 0.01 | | |
| T64 (%) | 0.02 | | |
| T66 (%) | 1.38 | | |
| T69 (%) | 0.79 | | |
| T71 (%) | 2.30 | | |

| Wavelength (nm) | Transmittance at 0 degrees (%) | Refractive index of material | Thickness (nm) |
|---|---|---|---|
| 300 | 0.00 | High | 12 |
| 305 | 0.00 | Low | 28 |
| 310 | 0.03 | High | 87 |
| 315 | 0.00 | Low | 132 |
| 320 | 0.02 | High | 71 |
| 325 | 0.36 | Low | 146 |
| 330 | 0.20 | High | 99 |
| 335 | 0.74 | Low | 153 |
| 340 | 0.28 | High | 102 |
| 345 | 1.17 | Low | 163 |
| 350 | 0.71 | High | 109 |
| 355 | 2.17 | Low | 146 |
| 360 | 5.71 | High | 80 |
| 365 | 5.37 | Low | 163 |
| 370 | 8.18 | High | 90 |
| 375 | 34.57 | Low | 123 |
| 380 | 43.10 | High | 91 |
| 385 | 52.30 | Low | 149 |
| 390 | 64.57 | High | 64 |
| 395 | 77.95 | Low | 124 |
| 400 | 86.13 | High | 53 |
| 405 | 87.65 | Low | 119 |
| 410 | 89.09 | High | 74 |
| 415 | 90.36 | Low | 163 |
| 420 | 91.64 | High | 78 |
| 425 | 92.40 | Low | 111 |
| 430 | 93.14 | High | 57 |
| 435 | 93.86 | Low | 112 |
| 440 | 95.21 | High | 55 |
| 445 | 95.99 | Low | 113 |
| 450 | 95.83 | High | 63 |
| 455 | 96.30 | Low | 147 |
| 460 | 96.18 | High | 0 |
| 465 | 96.13 | Low | 126 |
| 470 | 96.49 | High | 95 |
| 475 | 95.63 | Low | 159 |
| 480 | 96.45 | High | 26 |
| 485 | 95.79 | Low | 142 |
| 490 | 96.78 | High | 51 |
| 495 | 96.72 | Low | 118 |
| 500 | 72.50 | High | 53 |
| 505 | 1.83 | Low | 128 |
| 510 | 0.15 | High | 24 |
| 515 | 0.03 | Low | 130 |
| 520 | 0.02 | High | 49 |
| 525 | 0.01 | Low | 120 |
| 530 | 0.02 | High | 45 |
| 535 | 0.02 | Low | 118 |
| 540 | 0.02 | High | 52 |
| 545 | 0.04 | Low | 113 |
| 550 | 0.56 | High | 52 |
| 555 | 0.15 | Low | 132 |
| 560 | 0.06 | High | 23 |
| 565 | 0.04 | Low | 127 |
| 570 | 0.01 | High | 56 |
| 575 | 0.01 | Low | 132 |
| 580 | 0.01 | High | 27 |
| 585 | 0.02 | Low | 131 |

TABLE 9-continued

| | | | |
|---|---|---|---|
| 590 | 0.05 | High | 59 |
| 595 | 0.01 | Low | 56 |
| 600 | 0.00 | | |
| 605 | 0.00 | | |
| 610 | 0.00 | | |
| 615 | 0.01 | | |
| 620 | 0.01 | | |
| 625 | 0.01 | | |
| 630 | 0.01 | | |
| 635 | 0.01 | | |
| 640 | 0.02 | | |
| 645 | 0.09 | | |
| 650 | 0.97 | | |
| 655 | 1.87 | | |
| 660 | 1.38 | | |
| 665 | 1.72 | | |
| 670 | 0.94 | | |
| 675 | 0.74 | | |
| 680 | 1.21 | | |
| 685 | 2.07 | | |
| 690 | 0.79 | | |
| 695 | 0.42 | | |
| 700 | 0.41 | | |
| 705 | 0.79 | | |
| 710 | 2.30 | | |
| 715 | 0.83 | | |
| 720 | 0.33 | | |
| 725 | 0.23 | | |
| 730 | 0.25 | | |
| 735 | 0.42 | | |
| 740 | 1.10 | | |
| 745 | 1.43 | | |
| 750 | 0.61 | | |
| 755 | 0.37 | | |
| 760 | 0.34 | | |
| 765 | 0.44 | | |
| 770 | 0.74 | | |
| 775 | 1.04 | | |
| 780 | 0.77 | | |
| 785 | 0.51 | | |
| 790 | 0.43 | | |
| 795 | 0.50 | | |
| 800 | 0.81 | | |
| 805 | 1.82 | | |
| 810 | 2.73 | | |
| 815 | 1.24 | | |
| 820 | 0.62 | | |
| 825 | 0.42 | | |
| 830 | 0.38 | | |
| 835 | 0.41 | | |
| 840 | 0.55 | | |
| 845 | 0.88 | | |
| 850 | 1.49 | | |
| 855 | 1.95 | | |
| 860 | 1.70 | | |
| 865 | 1.36 | | |
| 870 | 1.25 | | |
| 875 | 1.40 | | |
| 880 | 1.91 | | |
| 885 | 2.93 | | |
| 890 | 3.60 | | |
| 895 | 2.57 | | |
| 900 | 1.54 | | |
| 905 | 1.03 | | |
| 910 | 0.81 | | |
| 915 | 0.73 | | |
| 920 | 0.74 | | |
| 925 | 0.84 | | |
| 930 | 1.04 | | |
| 935 | 1.35 | | |
| 940 | 1.67 | | |
| 945 | 1.78 | | |
| 950 | 1.61 | | |
| 955 | 1.36 | | |
| 960 | 1.16 | | |
| 965 | 1.06 | | |
| 970 | 1.04 | | |
| 975 | 1.11 | | |
| 980 | 1.28 | | |
| 985 | 1.62 | | |
| 990 | 2.23 | | |
| 995 | 3.43 | | |
| 1000 | 5.94 | | |

2nd Example

The optical lens element according to the 2nd example includes a long wavelength filter coating. The ranges of the parameters of the optical lens element of the 2nd example are the same as those of the 1st example, which will not be provided again.

Figure 2:
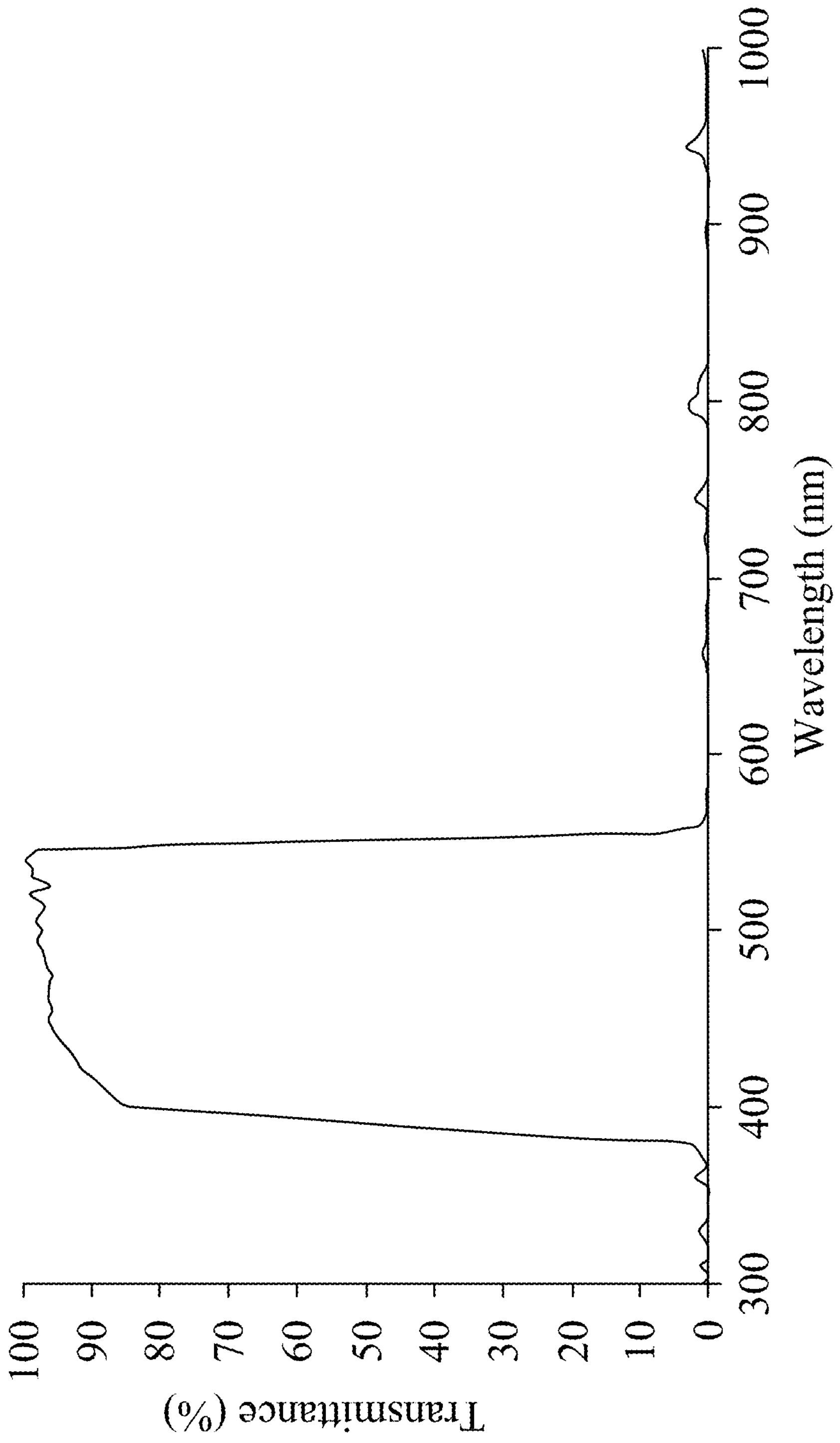
FIG. 2 is a relationship diagram of transmittance and wavelength of the optical lens element according to the 2nd example.

Please refer to FIG. 2 and Table 10. FIG. 2 is a relationship diagram of transmittance and wavelength of the optical lens element according to the 2nd example. The incident angle of the light that strikes on the optical lens element is 0 degrees, and the transmittances of lights with different wavelengths are listed in Table 10. From FIG. 2 and Table 10, it shows that the optical lens element including the long wavelength filter coating according to the 2nd example can effectively filter out long wavelength light, so as to improve imaging quality.

TABLE 10

| 2nd Example | | | |
|---|---|---|---|
| LWdT5 (nm) | 550-555 | tLs | 50 |
| sLWdT5 | 11.71 | tTk (nm) | 5280 |
| T4050 (%) | 93.54 | HtTK (nm) | 1938 |
| T4060 (%) | 71.18 | LtTK (nm) | 3343 |
| T4350 (%) | 95.59 | LtTK/HtTK | 1.72 |
| T4555 (%) | 95.34 | | |
| T5060 (%) | 50.06 | | |
| T60100 (%) | 0.44 | | |
| T65100 (%) | 0.49 | | |
| T70100 (%) | 0.51 | | |
| T50 (%) | 97.04 | | |
| T55 (%) | 65.43 | | |
| T57 (%) | 0.33 | | |
| T60 (%) | 0.12 | | |
| T63 (%) | 0.05 | | |
| T64 (%) | 0.12 | | |
| T66 (%) | 0.90 | | |
| T69 (%) | 0.15 | | |
| T71 (%) | 0.18 | | |

| Wavelength (nm) | Transmittance at 0 degrees (%) | Refractive index of material | Thickness (nm) |
|---|---|---|---|
| 300 | 0.76 | High | 11 |
| 305 | 0.38 | Low | 14 |
| 310 | 1.00 | High | 83 |
| 315 | 0.17 | Low | 161 |
| 320 | 0.13 | High | 102 |
| 325 | 0.56 | Low | 147 |
| 330 | 1.33 | High | 90 |
| 335 | 0.19 | Low | 164 |
| 340 | 0.10 | High | 108 |
| 345 | 0.11 | Low | 171 |
| 350 | 0.04 | High | 111 |
| 355 | 0.20 | Low | 169 |
| 360 | 2.01 | High | 110 |
| 365 | 0.29 | Low | 154 |
| 370 | 0.87 | High | 80 |
| 375 | 1.58 | Low | 152 |
| 380 | 2.79 | High | 108 |
| 385 | 35.93 | Low | 150 |
| 390 | 48.37 | High | 79 |
| 395 | 63.98 | Low | 146 |
| 400 | 84.27 | High | 92 |
| 405 | 86.33 | Low | 141 |

TABLE 10-continued

| | | | |
|---|---|---|---|
| 410 | 87.96 | High | 69 |
| 415 | 89.41 | Low | 134 |
| 420 | 90.82 | High | 61 |
| 425 | 91.61 | Low | 149 |
| 430 | 92.40 | High | 119 |
| 435 | 93.40 | Low | 146 |
| 440 | 94.73 | High | 62 |
| 445 | 95.44 | Low | 125 |
| 450 | 95.77 | High | 62 |
| 455 | 95.46 | Low | 118 |
| 460 | 95.62 | High | 63 |
| 465 | 95.65 | Low | 116 |
| 470 | 95.69 | High | 63 |
| 475 | 95.50 | Low | 116 |
| 480 | 96.21 | High | 62 |
| 485 | 96.47 | Low | 122 |
| 490 | 97.01 | High | 57 |
| 495 | 97.47 | Low | 123 |
| 500 | 97.04 | High | 61 |
| 505 | 97.62 | Low | 120 |
| 510 | 97.29 | High | 61 |
| 515 | 96.40 | Low | 130 |
| 520 | 98.57 | High | 51 |
| 525 | 95.79 | Low | 141 |
| 530 | 98.22 | High | 59 |
| 535 | 98.26 | Low | 153 |
| 540 | 99.11 | High | 114 |
| 545 | 97.61 | Low | 80 |
| 550 | 65.43 | | |
| 555 | 6.90 | | |
| 560 | 1.30 | | |
| 565 | 0.51 | | |
| 570 | 0.33 | | |
| 575 | 0.30 | | |
| 580 | 0.21 | | |
| 585 | 0.12 | | |
| 590 | 0.08 | | |
| 595 | 0.08 | | |
| 600 | 0.12 | | |
| 605 | 0.16 | | |
| 610 | 0.09 | | |
| 615 | 0.05 | | |
| 620 | 0.04 | | |
| 625 | 0.04 | | |
| 630 | 0.05 | | |
| 635 | 0.08 | | |
| 640 | 0.12 | | |
| 645 | 0.19 | | |
| 650 | 0.36 | | |
| 655 | 0.85 | | |
| 660 | 0.90 | | |
| 665 | 0.43 | | |
| 670 | 0.28 | | |
| 675 | 0.26 | | |
| 680 | 0.26 | | |
| 685 | 0.22 | | |
| 690 | 0.15 | | |
| 695 | 0.11 | | |
| 700 | 0.10 | | |
| 705 | 0.12 | | |
| 710 | 0.18 | | |
| 715 | 0.35 | | |
| 720 | 0.56 | | |
| 725 | 0.46 | | |
| 730 | 0.35 | | |
| 735 | 0.37 | | |
| 740 | 0.66 | | |
| 745 | 2.14 | | |
| 750 | 1.01 | | |
| 755 | 0.27 | | |
| 760 | 0.13 | | |
| 765 | 0.09 | | |
| 770 | 0.08 | | |
| 775 | 0.09 | | |
| 780 | 0.13 | | |
| 785 | 0.24 | | |
| 790 | 0.68 | | |
| 795 | 2.86 | | |
| 800 | 2.74 | | |
| 805 | 1.56 | | |
| 810 | 1.45 | | |
| 815 | 1.11 | | |
| 820 | 0.40 | | |
| 825 | 0.15 | | |
| 830 | 0.07 | | |
| 835 | 0.04 | | |
| 840 | 0.03 | | |
| 845 | 0.02 | | |
| 850 | 0.02 | | |
| 855 | 0.02 | | |
| 860 | 0.02 | | |
| 865 | 0.02 | | |
| 870 | 0.03 | | |
| 875 | 0.04 | | |
| 880 | 0.07 | | |
| 885 | 0.14 | | |
| 890 | 0.29 | | |
| 895 | 0.36 | | |
| 900 | 0.24 | | |
| 905 | 0.16 | | |
| 910 | 0.12 | | |
| 915 | 0.12 | | |
| 920 | 0.13 | | |
| 925 | 0.16 | | |
| 930 | 0.24 | | |
| 935 | 0.45 | | |
| 940 | 1.15 | | |
| 945 | 3.16 | | |
| 950 | 1.87 | | |
| 955 | 0.76 | | |
| 960 | 0.43 | | |
| 965 | 0.30 | | |
| 970 | 0.25 | | |
| 975 | 0.23 | | |
| 980 | 0.24 | | |
| 985 | 0.27 | | |
| 990 | 0.34 | | |
| 995 | 0.46 | | |
| 1000 | 0.68 | | |

3rd Example

The optical lens element according to the 3rd example includes a long wavelength filter coating. The ranges of the parameters of the optical lens element of the 3rd example are the same as those of the 1st example, which will not be provided again.

Figure 3:
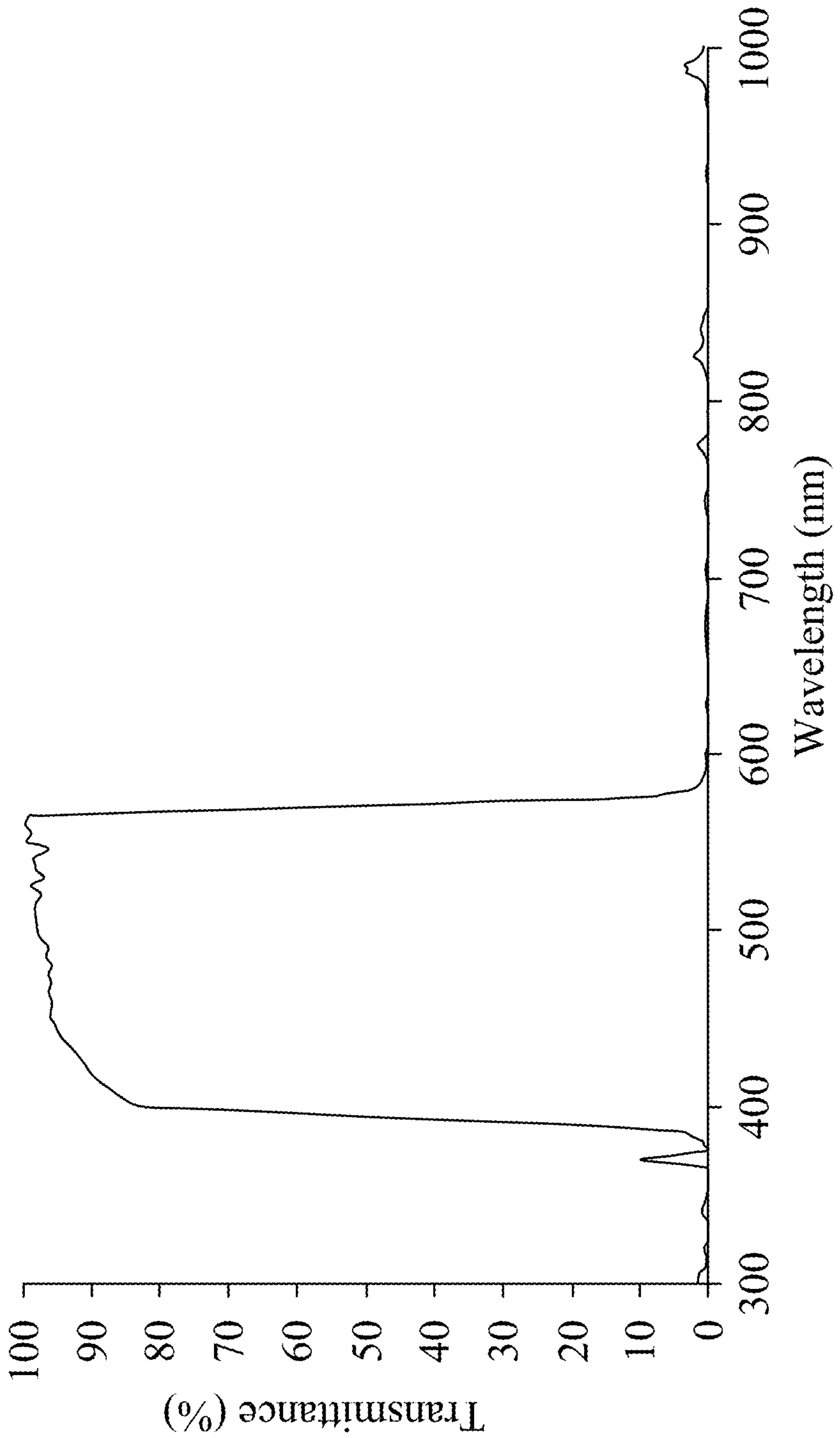
FIG. 3 is a relationship diagram of transmittance and wavelength of the optical lens element according to the 3rd example.

Please refer to FIG. 3 and Table 11. FIG. 3 is a relationship diagram of transmittance and wavelength of the optical lens element according to the 3rd example. The incident angle of the light that strikes on the optical lens element is 0 degrees, and the transmittances of lights with different wavelengths are listed in Table 11. From FIG. 3 and Table 11, it shows that the optical lens element including the long wavelength filter coating according to the 3rd example can effectively filter out long wavelength light, so as to improve imaging quality.

TABLE 11

| 3rd Example | | | |
|---|---|---|---|
| LWdT5 (nm) | 570-575 | tLs | 50 |
| sLWdT5 | 10.27 | tTk (nm) | 5460 |
| T4050 (%) | 93.24 | HtTK (nm) | 2012 |
| T4060 (%) | 80.58 | LtTK (nm) | 3448 |
| T4350 (%) | 95.49 | LtTK/HtTK | 1.71 |
| T4555 (%) | 96.94 | | |
| T5060 (%) | 68.72 | | |
| T60100 (%) | 0.36 | | |
| T65100 (%) | 0.39 | | |
| T70100 (%) | 0.41 | | |

TABLE 11-continued

| | |
|---|---|
| T50 (%) | 97.69 |
| T55 (%) | 99.12 |
| T57 (%) | 59.16 |
| T60 (%) | 0.25 |
| T63 (%) | 0.22 |
| T64 (%) | 0.11 |
| T66 (%) | 0.31 |
| T69 (%) | 0.16 |
| T71 (%) | 0.23 |

| Wavelength (nm) | Transmittance at 0 degrees (%) | Refractive index of material | Thickness (nm) |
|---|---|---|---|
| 300 | 1.67 | High | 12 |
| 305 | 1.37 | Low | 13 |
| 310 | 0.22 | High | 86 |
| 315 | 0.23 | Low | 164 |
| 320 | 0.63 | High | 104 |
| 325 | 0.03 | Low | 153 |
| 330 | 0.05 | High | 96 |
| 335 | 0.08 | Low | 170 |
| 340 | 0.85 | High | 111 |
| 345 | 0.56 | Low | 177 |
| 350 | 0.20 | High | 115 |
| 355 | 0.04 | Low | 174 |
| 360 | 0.12 | High | 112 |
| 365 | 0.14 | Low | 158 |
| 370 | 9.76 | High | 86 |
| 375 | 0.41 | Low | 154 |
| 380 | 0.81 | High | 105 |
| 385 | 3.55 | Low | 153 |
| 390 | 21.07 | High | 83 |
| 395 | 53.28 | Low | 148 |
| 400 | 82.77 | High | 104 |
| 405 | 85.48 | Low | 153 |
| 410 | 87.28 | High | 74 |
| 415 | 88.85 | Low | 135 |
| 420 | 90.24 | High | 69 |
| 425 | 91.15 | Low | 151 |
| 430 | 91.88 | High | 115 |
| 435 | 93.08 | Low | 152 |
| 440 | 94.60 | High | 66 |
| 445 | 94.97 | Low | 132 |
| 450 | 95.74 | High | 63 |
| 455 | 95.73 | Low | 123 |
| 460 | 95.79 | High | 67 |
| 465 | 95.87 | Low | 119 |
| 470 | 95.63 | High | 66 |
| 475 | 96.02 | Low | 122 |
| 480 | 95.79 | High | 63 |
| 485 | 96.14 | Low | 124 |
| 490 | 96.09 | High | 63 |
| 495 | 97.30 | Low | 125 |
| 500 | 97.69 | High | 62 |
| 505 | 97.90 | Low | 131 |
| 510 | 98.09 | High | 57 |
| 515 | 98.00 | Low | 140 |
| 520 | 97.18 | High | 55 |
| 525 | 98.54 | Low | 141 |
| 530 | 96.70 | High | 68 |
| 535 | 98.02 | Low | 154 |
| 540 | 98.12 | High | 112 |
| 545 | 96.24 | Low | 83 |
| 550 | 99.12 | | |
| 555 | 98.77 | | |
| 560 | 99.35 | | |
| 565 | 98.96 | | |
| 570 | 59.16 | | |
| 575 | 7.83 | | |
| 580 | 1.74 | | |
| 585 | 0.72 | | |
| 590 | 0.47 | | |
| 595 | 0.37 | | |
| 600 | 0.25 | | |
| 605 | 0.15 | | |
| 610 | 0.10 | | |
| 615 | 0.10 | | |
| 620 | 0.13 | | |
| 625 | 0.21 | | |

TABLE 11-continued

| | |
|---|---|
| 630 | 0.22 |
| 635 | 0.14 |
| 640 | 0.11 |
| 645 | 0.12 |
| 650 | 0.16 |
| 655 | 0.24 |
| 660 | 0.31 |
| 665 | 0.36 |
| 670 | 0.45 |
| 675 | 0.50 |
| 680 | 0.35 |
| 685 | 0.21 |
| 690 | 0.16 |
| 695 | 0.16 |
| 700 | 0.20 |
| 705 | 0.27 |
| 710 | 0.23 |
| 715 | 0.15 |
| 720 | 0.11 |
| 725 | 0.10 |
| 730 | 0.12 |
| 735 | 0.19 |
| 740 | 0.32 |
| 745 | 0.33 |
| 750 | 0.22 |
| 755 | 0.17 |
| 760 | 0.18 |
| 765 | 0.28 |
| 770 | 0.85 |
| 775 | 1.52 |
| 780 | 0.31 |
| 785 | 0.12 |
| 790 | 0.07 |
| 795 | 0.06 |
| 800 | 0.06 |
| 805 | 0.08 |
| 810 | 0.13 |
| 815 | 0.31 |
| 820 | 1.06 |
| 825 | 1.98 |
| 830 | 1.04 |
| 835 | 0.81 |
| 840 | 0.95 |
| 845 | 0.72 |
| 850 | 0.24 |
| 855 | 0.09 |
| 860 | 0.04 |
| 865 | 0.02 |
| 870 | 0.02 |
| 875 | 0.01 |
| 880 | 0.01 |
| 885 | 0.01 |
| 890 | 0.01 |
| 895 | 0.01 |
| 900 | 0.01 |
| 905 | 0.02 |
| 910 | 0.03 |
| 915 | 0.06 |
| 920 | 0.12 |
| 925 | 0.26 |
| 930 | 0.27 |
| 935 | 0.16 |
| 940 | 0.11 |
| 945 | 0.08 |
| 950 | 0.08 |
| 955 | 0.08 |
| 960 | 0.09 |
| 965 | 0.12 |
| 970 | 0.19 |
| 975 | 0.36 |
| 980 | 0.90 |
| 985 | 3.07 |
| 990 | 3.40 |
| 995 | 1.29 |
| 1000 | 0.67 |

4th Example

The optical lens element according to the 4th example includes a long wavelength filter coating. When a total number of coating layers of the long wavelength filter coating is tLs, a total thickness of coating layers of the long wavelength filter coating is tTk, an average transmittance between a wavelength of 500 nm-600 nm of the optical lens element including the long wavelength filter coating is T5060, and an average transmittance between a wavelength of 650 nm-1000 nm of the optical lens element including the long wavelength filter coating is T65100, the following conditions can be satisfied: 40≤tLs≤90; 4000 nm<tTk≤10000 nm; 75%≤T5060; and T65100≤5%.

Figure 4:
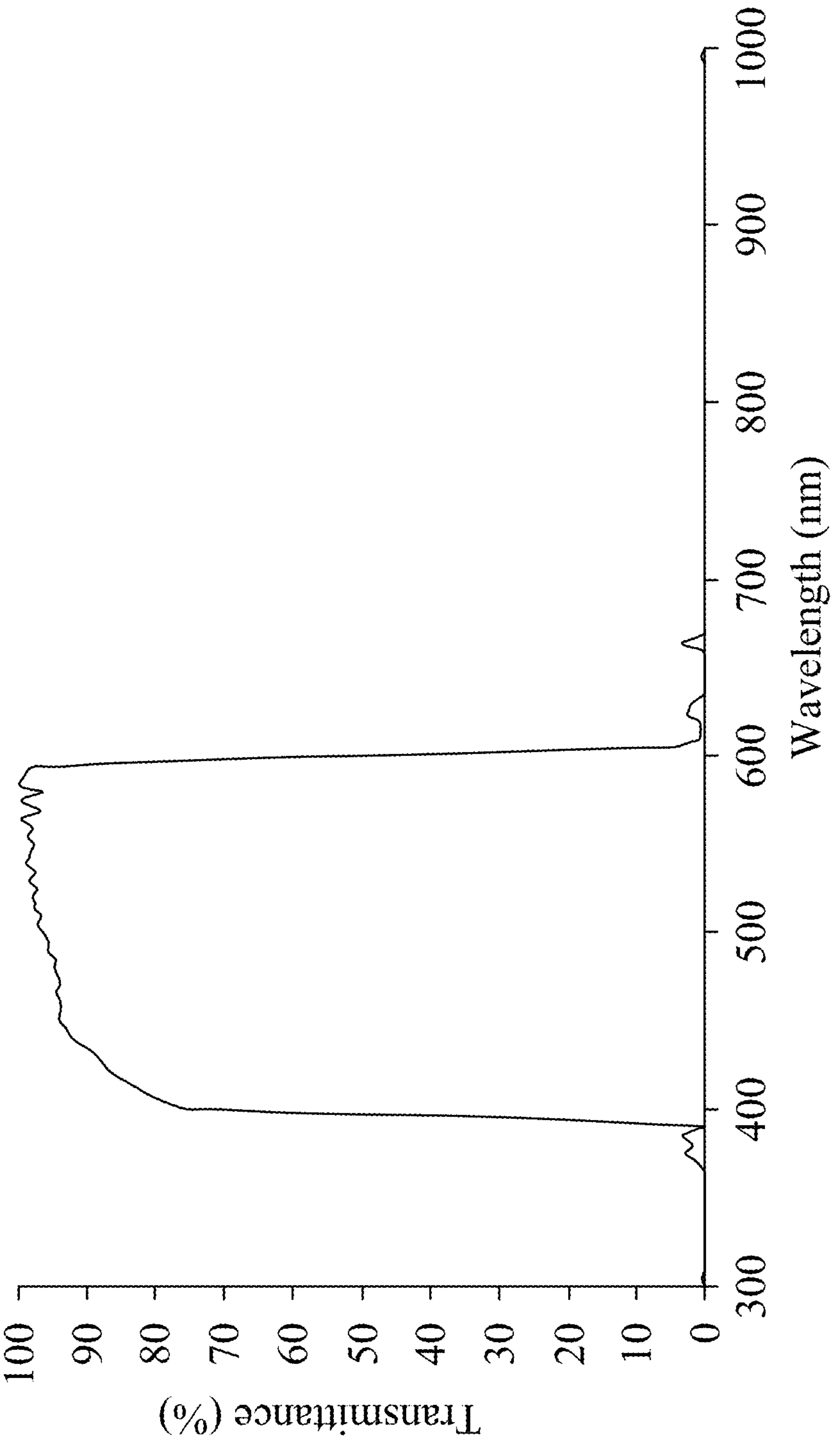
FIG. 4 is a relationship diagram of transmittance and wavelength of the optical lens element according to the 4th example.

Please refer to FIG. 4 and Table 12. FIG. 4 is a relationship diagram of transmittance and wavelength of the optical lens element according to the 4th example. The incident angle of the light that strikes on the optical lens element is 0 degrees, and the transmittances of lights with different wavelengths are listed in Table 12. From FIG. 4 and Table 12, it shows that the optical lens element including the long wavelength filter coating according to the 4th example can effectively filter out long wavelength light, so as to improve imaging quality.

TABLE 12

| 4th Example | | | |
|---|---|---|---|
| LWdT5 (nm) | 600-605 | tLs | 72 |
| sLWdT5 | 11.87 | tTk (nm) | 8139 |
| T4050 (%) | 90.38 | HtTK (nm) | 2925 |
| T4060 (%) | 93.25 | LtTK (nm) | 5214 |
| T4350 (%) | 93.57 | LtTK/HtTK | 1.78 |
| T4555 (%) | 96.04 | | |
| T5060 (%) | 96.29 | | |
| T60100 (%) | 0.99 | | |
| T65100 (%) | 0.07 | | |
| T70100 (%) | 0.02 | | |
| T50 (%) | 96.60 | | |
| T55 (%) | 97.77 | | |
| T57 (%) | 96.76 | | |
| T60 (%) | 63.71 | | |
| T63 (%) | 2.13 | | |
| T64 (%) | 0.05 | | |
| T66 (%) | 0.33 | | |
| T69 (%) | 0.00 | | |
| T71 (%) | 0.00 | | |

| Wavelength (nm) | Transmittance at 0 degrees (%) | Refractive index of material | Thickness (nm) |
|---|---|---|---|
| 300 | 0.17 | High | 11 |
| 305 | 0.34 | Low | 34 |
| 310 | 0.05 | High | 100 |
| 315 | 0.08 | Low | 149 |
| 320 | 0.00 | High | 96 |
| 325 | 0.00 | Low | 163 |
| 330 | 0.00 | High | 101 |
| 335 | 0.00 | Low | 153 |
| 340 | 0.00 | High | 95 |
| 345 | 0.00 | Low | 163 |
| 350 | 0.00 | High | 103 |
| 355 | 0.00 | Low | 159 |
| 360 | 0.01 | High | 100 |
| 365 | 0.13 | Low | 168 |
| 370 | 1.22 | High | 110 |
| 375 | 2.79 | Low | 175 |
| 380 | 1.79 | High | 110 |
| 385 | 3.23 | Low | 159 |
| 390 | 0.11 | High | 93 |
| 395 | 22.05 | Low | 162 |
| 400 | 75.51 | High | 109 |
| 405 | 79.32 | Low | 159 |

TABLE 12-continued

| | | | |
|---|---|---|---|
| 410 | 81.88 | High | 88 |
| 415 | 84.10 | Low | 158 |
| 420 | 86.17 | High | 110 |
| 425 | 87.41 | Low | 159 |
| 430 | 88.37 | High | 81 |
| 435 | 90.04 | Low | 139 |
| 440 | 92.07 | High | 77 |
| 445 | 92.71 | Low | 156 |
| 450 | 93.77 | High | 116 |
| 455 | 93.68 | Low | 160 |
| 460 | 93.99 | High | 71 |
| 465 | 94.13 | Low | 145 |
| 470 | 94.05 | High | 57 |
| 475 | 94.26 | Low | 147 |
| 480 | 94.43 | High | 56 |
| 485 | 94.42 | Low | 141 |
| 490 | 95.39 | High | 66 |
| 495 | 95.62 | Low | 133 |
| 500 | 96.60 | High | 74 |
| 505 | 96.95 | Low | 139 |
| 510 | 96.74 | High | 94 |
| 515 | 97.53 | Low | 160 |
| 520 | 97.73 | High | 88 |
| 525 | 97.20 | Low | 133 |
| 530 | 98.18 | High | 72 |
| 535 | 97.52 | Low | 135 |
| 540 | 98.60 | High | 64 |
| 545 | 98.20 | Low | 143 |
| 550 | 97.77 | High | 57 |
| 555 | 98.59 | Low | 148 |
| 560 | 97.91 | High | 58 |
| 565 | 99.37 | Low | 146 |
| 570 | 96.76 | High | 66 |
| 575 | 99.43 | Low | 142 |
| 580 | 96.50 | High | 72 |
| 585 | 99.73 | Low | 142 |
| 590 | 98.98 | High | 74 |
| 595 | 98.07 | Low | 141 |
| 600 | 63.71 | High | 71 |
| 605 | 4.36 | Low | 141 |
| 610 | 0.90 | High | 66 |
| 615 | 0.54 | Low | 141 |
| 620 | 0.78 | High | 65 |
| 625 | 2.56 | Low | 140 |
| 630 | 2.13 | High | 68 |
| 635 | 0.19 | Low | 140 |
| 640 | 0.05 | High | 76 |
| 645 | 0.04 | Low | 154 |
| 650 | 0.05 | High | 111 |
| 655 | 0.13 | Low | 86 |
| 660 | 0.33 | | |
| 665 | 3.29 | | |
| 670 | 0.06 | | |
| 675 | 0.02 | | |
| 680 | 0.01 | | |
| 685 | 0.00 | | |
| 690 | 0.00 | | |
| 695 | 0.00 | | |
| 700 | 0.00 | | |
| 705 | 0.00 | | |
| 710 | 0.00 | | |
| 715 | 0.00 | | |
| 720 | 0.00 | | |
| 725 | 0.00 | | |
| 730 | 0.00 | | |
| 735 | 0.00 | | |
| 740 | 0.00 | | |
| 745 | 0.00 | | |
| 750 | 0.00 | | |
| 755 | 0.00 | | |
| 760 | 0.00 | | |
| 765 | 0.00 | | |
| 770 | 0.00 | | |
| 775 | 0.00 | | |
| 780 | 0.00 | | |
| 785 | 0.00 | | |
| 790 | 0.00 | | |
| 795 | 0.00 | | |
| 800 | 0.00 | | |
| 805 | 0.00 | | |

TABLE 12-continued

| | |
|---|---|
| 810 | 0.00 |
| 815 | 0.01 |
| 820 | 0.00 |
| 825 | 0.01 |
| 830 | 0.08 |
| 835 | 0.00 |
| 840 | 0.00 |
| 845 | 0.00 |
| 850 | 0.00 |
| 855 | 0.00 |
| 860 | 0.12 |
| 865 | 0.01 |
| 870 | 0.00 |
| 875 | 0.00 |
| 880 | 0.00 |
| 885 | 0.00 |
| 890 | 0.00 |
| 895 | 0.00 |
| 900 | 0.00 |
| 905 | 0.00 |
| 910 | 0.00 |
| 915 | 0.00 |
| 920 | 0.00 |
| 925 | 0.00 |
| 930 | 0.00 |
| 935 | 0.00 |
| 940 | 0.00 |
| 945 | 0.01 |
| 950 | 0.01 |
| 955 | 0.00 |
| 960 | 0.00 |
| 965 | 0.00 |
| 970 | 0.00 |
| 975 | 0.00 |
| 980 | 0.01 |
| 985 | 0.03 |
| 990 | 0.16 |
| 995 | 0.45 |
| 1000 | 0.12 |

5th Example

The optical lens element according to the 5th example includes a long wavelength filter coating. When a total number of coating layers of the long wavelength filter coating is tLs, a total thickness of coating layers of the long wavelength filter coating is tTk, an average transmittance between a wavelength of 500 nm-600 nm of the optical lens element including the long wavelength filter coating is T5060, and an average transmittance between a wavelength of 650 nm-1000 nm of the optical lens element including the long wavelength filter coating is T65100, the following conditions can be satisfied: 40≤tLs≤90; 4000 nm<tTk≤10000 nm; 75%≤T5060; and T65100≤5%.

Figure 5:
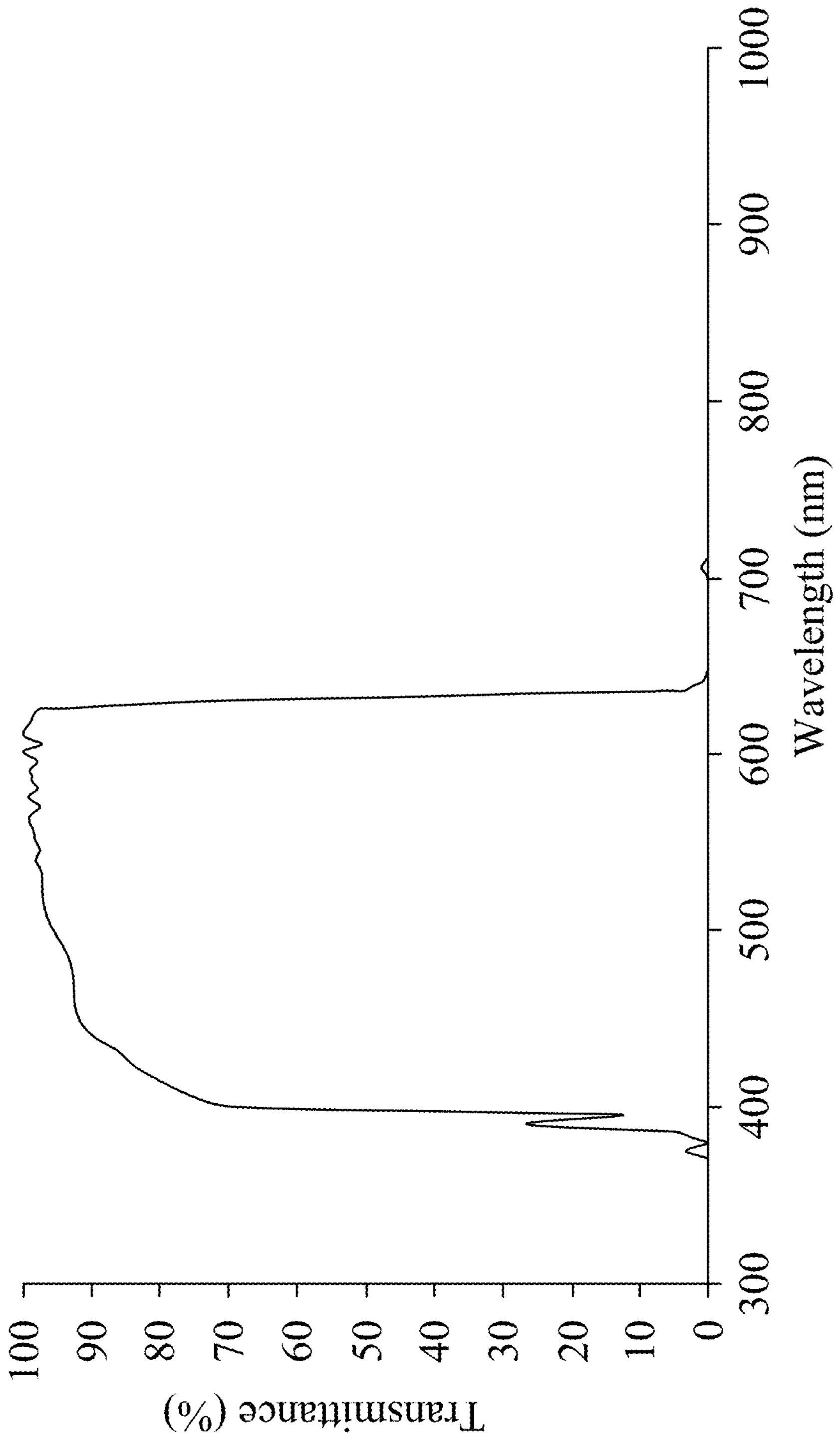
FIG. 5 is a relationship diagram of transmittance and wavelength of the optical lens element according to the 5th example.

Please refer to FIG. 5 and Table 13. FIG. 5 is a relationship diagram of transmittance and wavelength of the optical lens element according to the 5th example. The incident angle of the light that strikes on the optical lens element is 0 degrees, and the transmittances of lights with different wavelengths are listed in Table 13. From FIG. 5 and Table 13, it shows that the optical lens element including the long wavelength filter coating according to the 5th example can effectively filter out long wavelength light, so as to improve imaging quality.

TABLE 13

| 5th Example | | | |
|---|---|---|---|
| LWdT5 (nm) | 630-635 | tLs | 82 |
| sLWdT5 | 12.20 | tTk (nm) | 9824 |
| T4050 (%) | 88.13 | HtTK (nm) | 3688 |
| T4060 (%) | 92.96 | LtTK (nm) | 6136 |
| T4350 (%) | 92.05 | LtTK/HtTK | 1.66 |
| T4555 (%) | 95.26 | | |
| T5060 (%) | 97.93 | | |
| T60100 (%) | 8.22 | | |
| T65100 (%) | 0.04 | | |
| T70100 (%) | 0.03 | | |
| T50 (%) | 95.71 | | |
| T55 (%) | 98.20 | | |
| T57 (%) | 97.70 | | |
| T60 (%) | 99.85 | | |
| T63 (%) | 64.80 | | |
| T64 (%) | 0.80 | | |
| T66 (%) | 0.08 | | |
| T69 (%) | 0.12 | | |
| T71 (%) | 0.08 | | |
| Wavelength (nm) | Transmittance at 0 degrees (%) | Refractive index of material | Thickness (nm) |
| 300 | 0.11 | High | 9 |
| 305 | 0.01 | Low | 31 |
| 310 | 0.00 | High | 103 |
| 315 | 0.00 | Low | 166 |
| 320 | 0.00 | High | 109 |
| 325 | 0.00 | Low | 172 |
| 330 | 0.00 | High | 109 |
| 335 | 0.00 | Low | 172 |
| 340 | 0.00 | High | 110 |
| 345 | 0.00 | Low | 173 |
| 350 | 0.00 | High | 110 |
| 355 | 0.00 | Low | 173 |
| 360 | 0.00 | High | 107 |
| 365 | 0.00 | Low | 160 |
| 370 | 0.00 | High | 97 |
| 375 | 3.40 | Low | 164 |
| 380 | 0.52 | High | 109 |
| 385 | 4.57 | Low | 174 |
| 390 | 26.60 | High | 111 |
| 395 | 12.48 | Low | 176 |
| 400 | 70.52 | High | 111 |
| 405 | 74.65 | Low | 174 |
| 410 | 77.60 | High | 110 |
| 415 | 80.25 | Low | 168 |
| 420 | 82.73 | High | 99 |
| 425 | 84.23 | Low | 157 |
| 430 | 85.57 | High | 104 |
| 435 | 87.45 | Low | 173 |
| 440 | 90.08 | High | 111 |
| 445 | 91.21 | Low | 174 |
| 450 | 92.01 | High | 108 |
| 455 | 92.27 | Low | 159 |
| 460 | 92.43 | High | 91 |
| 465 | 92.56 | Low | 145 |
| 470 | 92.73 | High | 91 |
| 475 | 92.82 | Low | 159 |
| 480 | 92.94 | High | 103 |
| 485 | 93.48 | Low | 157 |
| 490 | 94.30 | High | 90 |
| 495 | 95.12 | Low | 144 |
| 500 | 95.71 | High | 89 |
| 505 | 96.27 | Low | 156 |
| 510 | 96.71 | High | 103 |
| 515 | 96.97 | Low | 158 |
| 520 | 97.28 | High | 90 |
| 525 | 97.34 | Low | 143 |
| 530 | 97.56 | High | 88 |
| 535 | 97.74 | Low | 156 |
| 540 | 98.18 | High | 104 |
| 545 | 97.84 | Low | 157 |
| 550 | 98.20 | High | 85 |
| 555 | 98.43 | Low | 138 |

TABLE 13-continued

| | | | |
|---|---|---|---|
| 560 | 98.66 | High | 77 |
| 565 | 99.05 | Low | 136 |
| 570 | 97.70 | High | 77 |
| 575 | 99.30 | Low | 138 |
| 580 | 98.06 | High | 83 |
| 585 | 98.65 | Low | 157 |
| 590 | 99.04 | High | 109 |
| 595 | 98.03 | Low | 159 |
| 600 | 99.85 | High | 82 |
| 605 | 97.36 | Low | 140 |
| 610 | 99.96 | High | 73 |
| 615 | 99.44 | Low | 140 |
| 620 | 98.71 | High | 69 |
| 625 | 98.15 | Low | 142 |
| 630 | 64.80 | High | 66 |
| 635 | 3.81 | Low | 143 |
| 640 | 0.80 | High | 66 |
| 645 | 0.40 | Low | 142 |
| 650 | 0.16 | High | 67 |
| 655 | 0.07 | Low | 140 |
| 660 | 0.08 | High | 69 |
| 665 | 0.12 | Low | 138 |
| 670 | 0.11 | High | 72 |
| 675 | 0.14 | Low | 137 |
| 680 | 0.12 | High | 74 |
| 685 | 0.08 | Low | 137 |
| 690 | 0.12 | High | 77 |
| 695 | 0.13 | Low | 139 |
| 700 | 0.19 | High | 77 |
| 705 | 1.11 | Low | 68 |
| 710 | 0.08 | | |
| 715 | 0.11 | | |
| 720 | 0.08 | | |
| 725 | 0.01 | | |
| 730 | 0.01 | | |
| 735 | 0.01 | | |
| 740 | 0.00 | | |
| 745 | 0.00 | | |
| 750 | 0.01 | | |
| 755 | 0.00 | | |
| 760 | 0.00 | | |
| 765 | 0.00 | | |
| 770 | 0.00 | | |
| 775 | 0.00 | | |
| 780 | 0.00 | | |
| 785 | 0.00 | | |
| 790 | 0.00 | | |
| 795 | 0.00 | | |
| 800 | 0.00 | | |
| 805 | 0.00 | | |
| 810 | 0.00 | | |
| 815 | 0.00 | | |
| 820 | 0.00 | | |
| 825 | 0.00 | | |
| 830 | 0.00 | | |
| 835 | 0.00 | | |
| 840 | 0.00 | | |
| 845 | 0.00 | | |
| 850 | 0.01 | | |
| 855 | 0.00 | | |
| 860 | 0.00 | | |
| 865 | 0.00 | | |
| 870 | 0.00 | | |
| 875 | 0.00 | | |
| 880 | 0.00 | | |
| 885 | 0.00 | | |
| 890 | 0.00 | | |
| 895 | 0.00 | | |
| 900 | 0.00 | | |
| 905 | 0.00 | | |
| 910 | 0.00 | | |
| 915 | 0.00 | | |
| 920 | 0.00 | | |
| 925 | 0.00 | | |
| 930 | 0.00 | | |
| 935 | 0.00 | | |
| 940 | 0.00 | | |
| 945 | 0.00 | | |
| 950 | 0.00 | | |
| 955 | 0.00 | | |
| 960 | 0.00 | | |
| 965 | 0.00 | | |
| 970 | 0.00 | | |
| 975 | 0.00 | | |
| 980 | 0.00 | | |
| 985 | 0.00 | | |
| 990 | 0.00 | | |
| 995 | 0.00 | | |
| 1000 | 0.00 | | |

6th Example

The optical lens element according to the 6th example includes a long wavelength filter coating. When a total number of coating layers of the long wavelength filter coating is tLs, a total thickness of coating layers of the long wavelength filter coating is tTk, an average transmittance between a wavelength of 500 nm-600 nm of the optical lens element including the long wavelength filter coating is T5060, and an average transmittance between a wavelength of 650 nm-1000 nm of the optical lens element including the long wavelength filter coating is T65100, the following conditions can be satisfied: 40≤tLs≤90; 4000 nm<tTk≤10000 nm; 75%≤T5060; and T65100≤10%.

Figure 6:
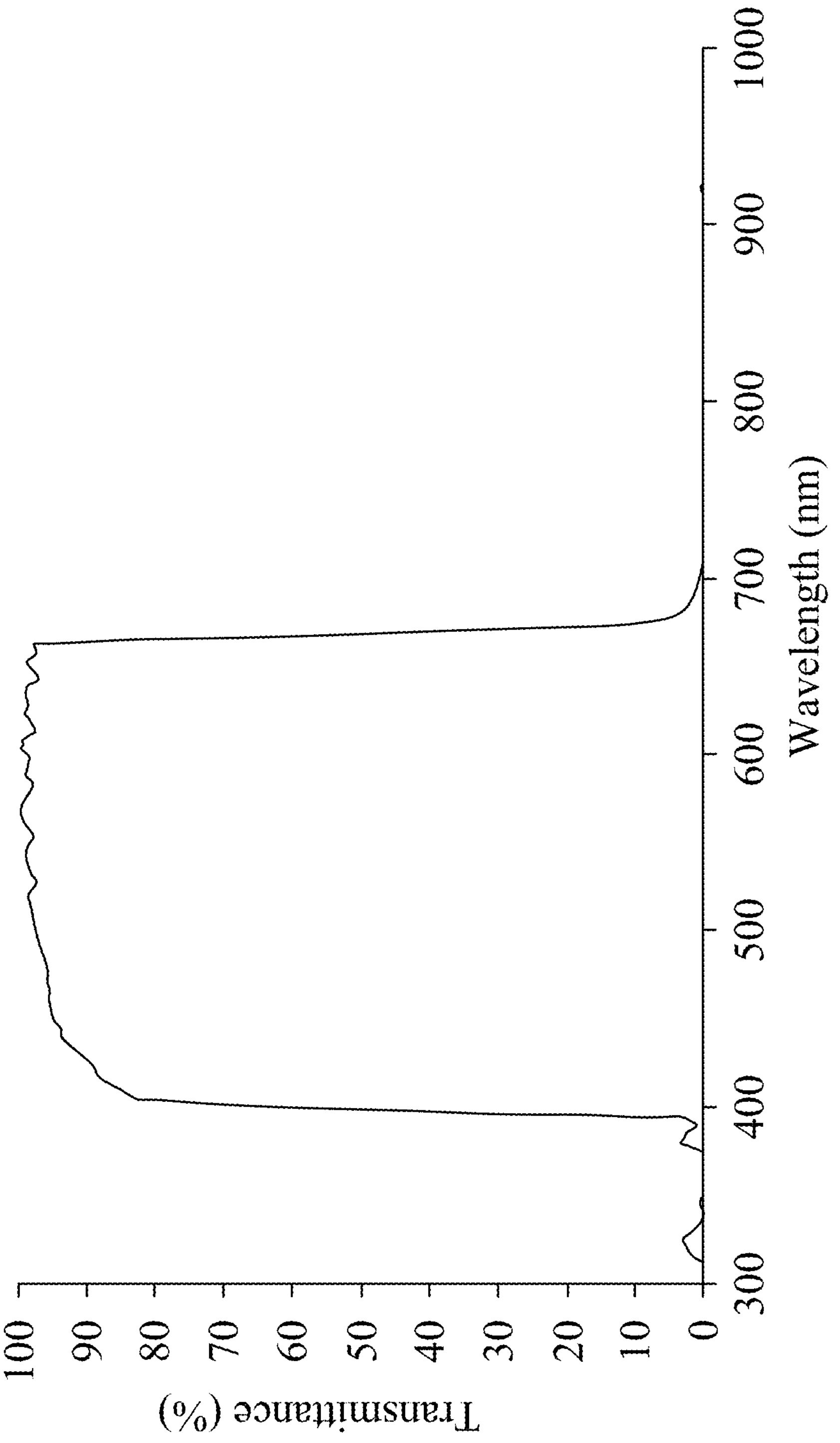
FIG. 6 is a relationship diagram of transmittance and wavelength of the optical lens element according to the 6th example.

Please refer to FIG. 6 and Table 14. FIG. 6 is a relationship diagram of transmittance and wavelength of the optical lens element according to the 6th example. The incident angle of the light that strikes on the optical lens element is 0 degrees, and the transmittances of lights with different wavelengths are listed in Table 14. From FIG. 6 and Table 14, it shows that the optical lens element including the long wavelength filter coating according to the 6th example can effectively filter out long wavelength light, so as to improve imaging quality.

TABLE 14

| 6th Example | | | |
|---|---|---|---|
| LWdT5 (nm) | 670-675 | tLs | 46 |
| sLWdT5 | 8.11 | tTk (nm) | 5540 |
| T4050 (%) | 91.45 | HtTK (nm) | 2122 |
| T4060 (%) | 94.88 | LtTK (nm) | 3418 |
| T4350 (%) | 95.10 | LtTK/HtTK | 1.61 |
| T4555 (%) | 97.05 | | |
| T5060 (%) | 98.44 | | |
| T60100 (%) | 18.07 | | |
| T65100 (%) | 6.72 | | |
| T70100 (%) | 0.07 | | |
| T50 (%) | 97.47 | | |
| T55 (%) | 98.57 | | |
| T57 (%) | 99.63 | | |
| T60 (%) | 98.49 | | |
| T63 (%) | 98.70 | | |
| T64 (%) | 99.03 | | |
| T66 (%) | 97.46 | | |
| T69 (%) | 1.49 | | |
| T71 (%) | 0.34 | | |

| Wavelength (nm) | Transmittance at 0 degrees (%) | Refractive index of material | Thickness (nm) |
|---|---|---|---|
| 300 | 0.00 | High | 11 |
| 305 | 0.06 | Low | 38 |
| 310 | 0.17 | High | 114 |
| 315 | 1.57 | Low | 177 |
| 320 | 2.42 | High | 113 |
| 325 | 2.95 | Low | 183 |
| 330 | 1.20 | High | 113 |

TABLE 14-continued

| 6th Example | | | |
|---|---|---|---|
| 335 | 0.40 | Low | 181 |
| 340 | 0.12 | High | 113 |
| 345 | 0.50 | Low | 174 |
| 350 | 0.30 | High | 100 |
| 355 | 0.03 | Low | 159 |
| 360 | 0.00 | High | 105 |
| 365 | 0.00 | Low | 179 |
| 370 | 0.01 | High | 113 |
| 375 | 0.15 | Low | 181 |
| 380 | 3.24 | High | 113 |
| 385 | 2.42 | Low | 179 |
| 390 | 1.09 | High | 105 |
| 395 | 3.43 | Low | 156 |
| 400 | 61.02 | High | 97 |
| 405 | 82.28 | Low | 172 |
| 410 | 85.10 | High | 110 |
| 415 | 87.26 | Low | 170 |
| 420 | 88.91 | High | 93 |
| 425 | 89.40 | Low | 143 |
| 430 | 90.86 | High | 85 |
| 435 | 92.38 | Low | 139 |
| 440 | 93.77 | High | 83 |
| 445 | 93.78 | Low | 138 |
| 450 | 94.88 | High | 82 |
| 455 | 95.24 | Low | 138 |
| 460 | 95.51 | High | 82 |
| 465 | 95.55 | Low | 138 |
| 470 | 95.63 | High | 81 |
| 475 | 95.72 | Low | 137 |
| 480 | 95.83 | High | 81 |
| 485 | 96.13 | Low | 138 |
| 490 | 96.63 | High | 82 |
| 495 | 97.06 | Low | 140 |
| 500 | 97.47 | High | 82 |
| 505 | 97.61 | Low | 141 |
| 510 | 98.04 | High | 83 |
| 515 | 98.23 | Low | 147 |
| 520 | 98.44 | High | 82 |
| 525 | 97.88 | Low | 71 |
| 530 | 97.59 | | |
| 535 | 98.52 | | |
| 540 | 98.79 | | |
| 545 | 98.82 | | |
| 550 | 98.57 | | |
| 555 | 98.04 | | |
| 560 | 98.65 | | |
| 565 | 99.41 | | |
| 570 | 99.63 | | |
| 575 | 99.32 | | |
| 580 | 98.14 | | |
| 585 | 97.94 | | |
| 590 | 98.93 | | |
| 595 | 98.69 | | |
| 600 | 98.49 | | |
| 605 | 99.67 | | |
| 610 | 99.38 | | |
| 615 | 97.80 | | |
| 620 | 98.13 | | |
| 625 | 99.00 | | |
| 630 | 98.70 | | |
| 635 | 99.05 | | |
| 640 | 99.03 | | |
| 645 | 97.34 | | |
| 650 | 97.69 | | |
| 655 | 98.81 | | |
| 660 | 97.46 | | |
| 665 | 97.81 | | |
| 670 | 55.93 | | |
| 675 | 15.36 | | |
| 680 | 5.10 | | |
| 685 | 2.39 | | |
| 690 | 1.49 | | |
| 695 | 1.11 | | |
| 700 | 0.84 | | |
| 705 | 0.55 | | |
| 710 | 0.34 | | |
| 715 | 0.22 | | |
| 720 | 0.16 | | |
| 725 | 0.14 | | |
| 730 | 0.12 | | |
| 735 | 0.10 | | |
| 740 | 0.08 | | |
| 745 | 0.06 | | |
| 750 | 0.05 | | |
| 755 | 0.05 | | |
| 760 | 0.07 | | |
| 765 | 0.12 | | |
| 770 | 0.14 | | |
| 775 | 0.07 | | |
| 780 | 0.03 | | |
| 785 | 0.01 | | |
| 790 | 0.01 | | |
| 795 | 0.01 | | |
| 800 | 0.01 | | |
| 805 | 0.01 | | |
| 810 | 0.01 | | |
| 815 | 0.01 | | |
| 820 | 0.02 | | |
| 825 | 0.03 | | |
| 830 | 0.03 | | |
| 835 | 0.03 | | |
| 840 | 0.03 | | |
| 845 | 0.03 | | |
| 850 | 0.04 | | |
| 855 | 0.06 | | |
| 860 | 0.05 | | |
| 865 | 0.02 | | |
| 870 | 0.01 | | |
| 875 | 0.01 | | |
| 880 | 0.01 | | |
| 885 | 0.00 | | |
| 890 | 0.00 | | |
| 895 | 0.00 | | |
| 900 | 0.01 | | |
| 905 | 0.01 | | |
| 910 | 0.02 | | |
| 915 | 0.05 | | |
| 920 | 0.21 | | |
| 925 | 0.06 | | |
| 930 | 0.02 | | |
| 935 | 0.01 | | |
| 940 | 0.01 | | |
| 945 | 0.00 | | |
| 950 | 0.00 | | |
| 955 | 0.00 | | |
| 960 | 0.00 | | |
| 965 | 0.00 | | |
| 970 | 0.01 | | |
| 975 | 0.01 | | |
| 980 | 0.01 | | |
| 985 | 0.02 | | |
| 990 | 0.04 | | |
| 995 | 0.07 | | |
| 1000 | 0.06 | | |

7th Example

The optical lens element according to the 7th example includes a long wavelength filter coating. When a total number of coating layers of the long wavelength filter coating is tLs, a total thickness of coating layers of the long wavelength filter coating is tTk, an average transmittance between a wavelength of 500 nm-600 nm of the optical lens element including the long wavelength filter coating is T5060, and an average transmittance between a wavelength of 650 nm-1000 nm of the optical lens element including the long wavelength filter coating is T65100, the following conditions can be satisfied: $40 \leq tLs \leq 90$; 4000 nm$<tTk \leq 10000$ nm; $75\% \leq T5060$; and $T65100 \leq 20\%$.

Figure 7:
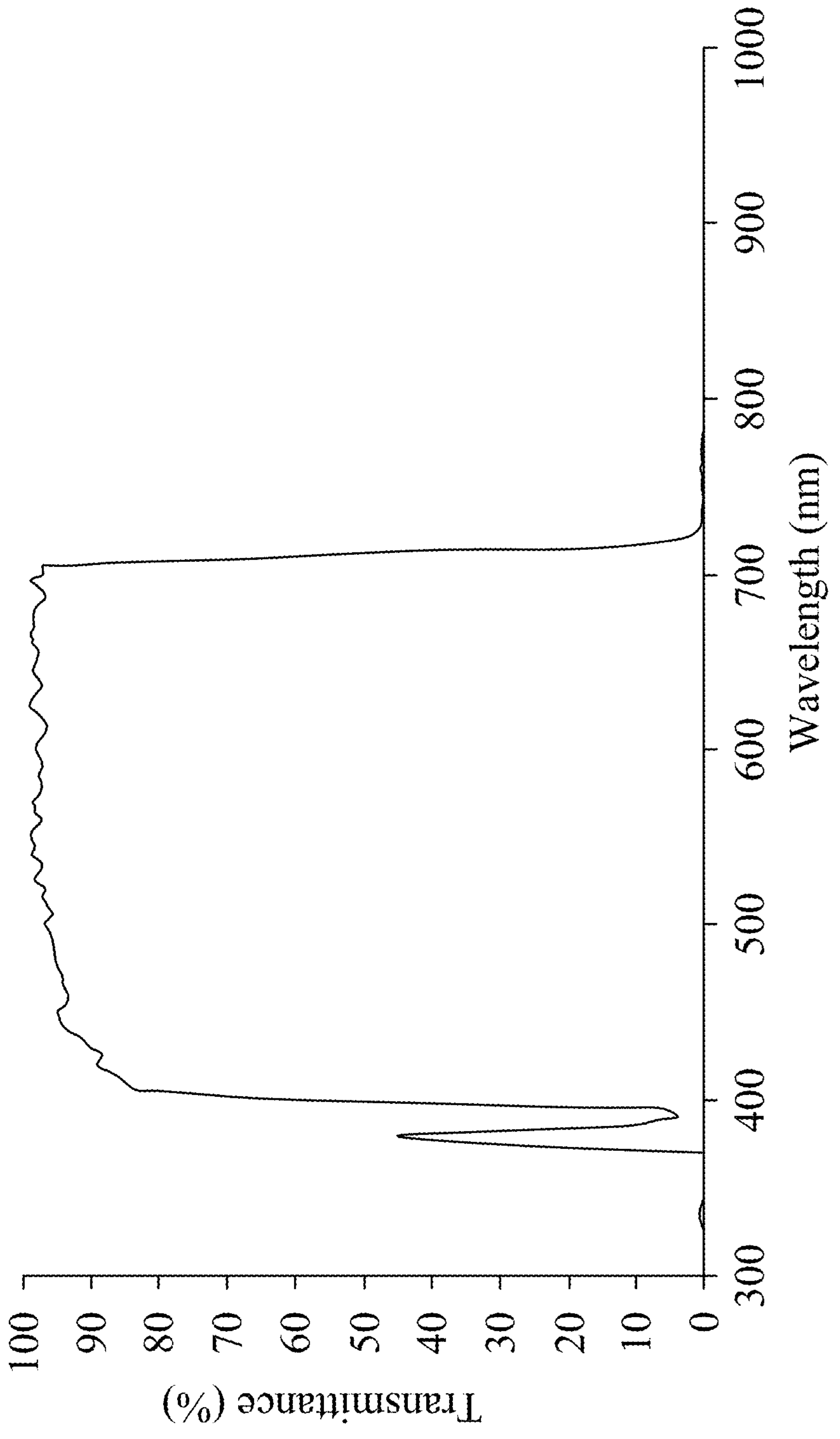
FIG. 7 is a relationship diagram of transmittance and wavelength of the optical lens element according to the 7th example.

Please refer to FIG. 7 and Table 15. FIG. 7 is a relationship diagram of transmittance and wavelength of the optical lens element according to the 7th example. The incident angle of the light that strikes on the optical lens element is 0 degrees, and the transmittances of lights with different wavelengths are listed in Table 15. From FIG. 7 and Table 15, it shows that the optical lens element including the long wavelength filter coating according to the 7th example can effectively filter out long wavelength light, so as to improve imaging quality.

TABLE 15

| 7th Example | | | |
|---|---|---|---|
| LWdT5 (nm) | 710-715 | tLs | 46 |
| sLWdT5 | 8.80 | tTk (nm) | 5580 |
| T4050 (%) | 91.03 | HtTK (nm) | 2142 |
| T4060 (%) | 94.32 | LtTK (nm) | 3437 |
| T4350 (%) | 94.44 | LtTK/HtTK | 1.60 |
| T4555 (%) | 96.31 | | |
| T5060 (%) | 97.75 | | |
| T60100 (%) | 27.53 | | |
| T65100 (%) | 17.61 | | |
| T70100 (%) | 4.39 | | |
| T50 (%) | 97.09 | | |
| T55 (%) | 98.99 | | |
| T57 (%) | 98.65 | | |
| T60 (%) | 98.30 | | |
| T63 (%) | 98.53 | | |
| T64 (%) | 97.97 | | |
| T66 (%) | 98.64 | | |
| T69 (%) | 97.30 | | |
| T71 (%) | 55.26 | | |

| Wavelength (nm) | Transmittance at 0 degrees (%) | Refractive index of material | Thickness (nm) |
|---|---|---|---|
| 300 | 0.00 | High | 13 |
| 305 | 0.00 | Low | 36 |
| 310 | 0.00 | High | 115 |
| 315 | 0.00 | Low | 169 |
| 320 | 0.00 | High | 99 |
| 325 | 0.04 | Low | 156 |
| 330 | 0.27 | High | 103 |
| 335 | 0.52 | Low | 175 |
| 340 | 0.23 | High | 113 |
| 345 | 0.01 | Low | 177 |
| 350 | 0.00 | High | 104 |
| 355 | 0.00 | Low | 155 |
| 360 | 0.00 | High | 98 |
| 365 | 0.00 | Low | 173 |
| 370 | 0.31 | High | 113 |
| 375 | 30.98 | Low | 181 |
| 380 | 44.72 | High | 108 |
| 385 | 9.76 | Low | 162 |
| 390 | 3.90 | High | 92 |
| 395 | 5.88 | Low | 166 |
| 400 | 61.17 | High | 109 |
| 405 | 82.99 | Low | 180 |
| 410 | 85.64 | High | 109 |
| 415 | 87.51 | Low | 164 |
| 420 | 89.22 | High | 90 |
| 425 | 88.48 | Low | 152 |
| 430 | 90.17 | High | 89 |
| 435 | 91.59 | Low | 142 |
| 440 | 94.06 | High | 88 |
| 445 | 94.69 | Low | 144 |
| 450 | 95.01 | High | 88 |
| 455 | 93.65 | Low | 145 |
| 460 | 93.55 | High | 86 |
| 465 | 94.37 | Low | 147 |
| 470 | 94.16 | High | 85 |
| 475 | 95.07 | Low | 148 |
| 480 | 95.56 | High | 86 |
| 485 | 95.49 | Low | 145 |
| 490 | 95.67 | High | 87 |
| 495 | 96.46 | Low | 144 |
| 500 | 97.09 | High | 91 |
| 505 | 95.96 | Low | 147 |

TABLE 15-continued

| 7th Example | | | |
|---|---|---|---|
| 510 | 96.38 | High | 89 |
| 515 | 97.12 | Low | 154 |
| 520 | 96.90 | High | 89 |
| 525 | 98.53 | Low | 73 |
| 530 | 97.78 | | |
| 535 | 97.58 | | |
| 540 | 98.71 | | |
| 545 | 98.45 | | |
| 550 | 98.99 | | |
| 555 | 98.50 | | |
| 560 | 97.39 | | |
| 565 | 98.40 | | |
| 570 | 98.65 | | |
| 575 | 97.49 | | |
| 580 | 97.48 | | |
| 585 | 97.75 | | |
| 590 | 97.48 | | |
| 595 | 97.80 | | |
| 600 | 98.30 | | |
| 605 | 97.70 | | |
| 610 | 96.66 | | |
| 615 | 96.66 | | |
| 620 | 98.03 | | |
| 625 | 99.12 | | |
| 630 | 98.53 | | |
| 635 | 97.60 | | |
| 640 | 97.97 | | |
| 645 | 98.68 | | |
| 650 | 98.34 | | |
| 655 | 98.01 | | |
| 660 | 98.64 | | |
| 665 | 99.00 | | |
| 670 | 98.67 | | |
| 675 | 98.72 | | |
| 680 | 98.39 | | |
| 685 | 96.96 | | |
| 690 | 97.30 | | |
| 695 | 98.89 | | |
| 700 | 97.23 | | |
| 705 | 97.18 | | |
| 710 | 55.26 | | |
| 715 | 11.24 | | |
| 720 | 2.68 | | |
| 725 | 0.90 | | |
| 730 | 0.41 | | |
| 735 | 0.23 | | |
| 740 | 0.17 | | |
| 745 | 0.16 | | |
| 750 | 0.19 | | |
| 755 | 0.31 | | |
| 760 | 0.52 | | |
| 765 | 0.28 | | |
| 770 | 0.11 | | |
| 775 | 0.06 | | |
| 780 | 0.05 | | |
| 785 | 0.05 | | |
| 790 | 0.06 | | |
| 795 | 0.11 | | |
| 800 | 0.08 | | |
| 805 | 0.03 | | |
| 810 | 0.02 | | |
| 815 | 0.01 | | |
| 820 | 0.01 | | |
| 825 | 0.01 | | |
| 830 | 0.02 | | |
| 835 | 0.07 | | |
| 840 | 0.01 | | |
| 845 | 0.00 | | |
| 850 | 0.00 | | |
| 855 | 0.00 | | |
| 860 | 0.00 | | |
| 865 | 0.00 | | |
| 870 | 0.00 | | |
| 875 | 0.00 | | |
| 880 | 0.00 | | |
| 885 | 0.00 | | |
| 890 | 0.00 | | |
| 895 | 0.00 | | |

TABLE 15-continued

| 7th Example | |
|---|---|
| 900 | 0.00 |
| 905 | 0.00 |
| 910 | 0.00 |
| 915 | 0.00 |
| 920 | 0.00 |
| 925 | 0.00 |
| 930 | 0.00 |
| 935 | 0.00 |
| 940 | 0.00 |
| 945 | 0.00 |
| 950 | 0.00 |
| 955 | 0.00 |
| 960 | 0.00 |
| 965 | 0.01 |
| 970 | 0.06 |
| 975 | 0.04 |
| 980 | 0.01 |
| 985 | 0.01 |
| 990 | 0.00 |
| 995 | 0.00 |
| 1000 | 0.00 |

8th Example

The optical lens element according to the 8th example includes a long wavelength filter coating. When a total number of coating layers of the long wavelength filter coating is tLs, a total thickness of coating layers of the long wavelength filter coating is tTk, an average transmittance between a wavelength of 500 nm-600 nm of the optical lens element including the long wavelength filter coating is T5060, and an average transmittance between a wavelength of 650 nm-1000 nm of the optical lens element including the long wavelength filter coating is T65100, the following conditions can be satisfied: 40≤tLs≤90; 4000 nm<tTk≤10000 nm; 75%≤T5060; and T65100≤20%.

Figure 8:
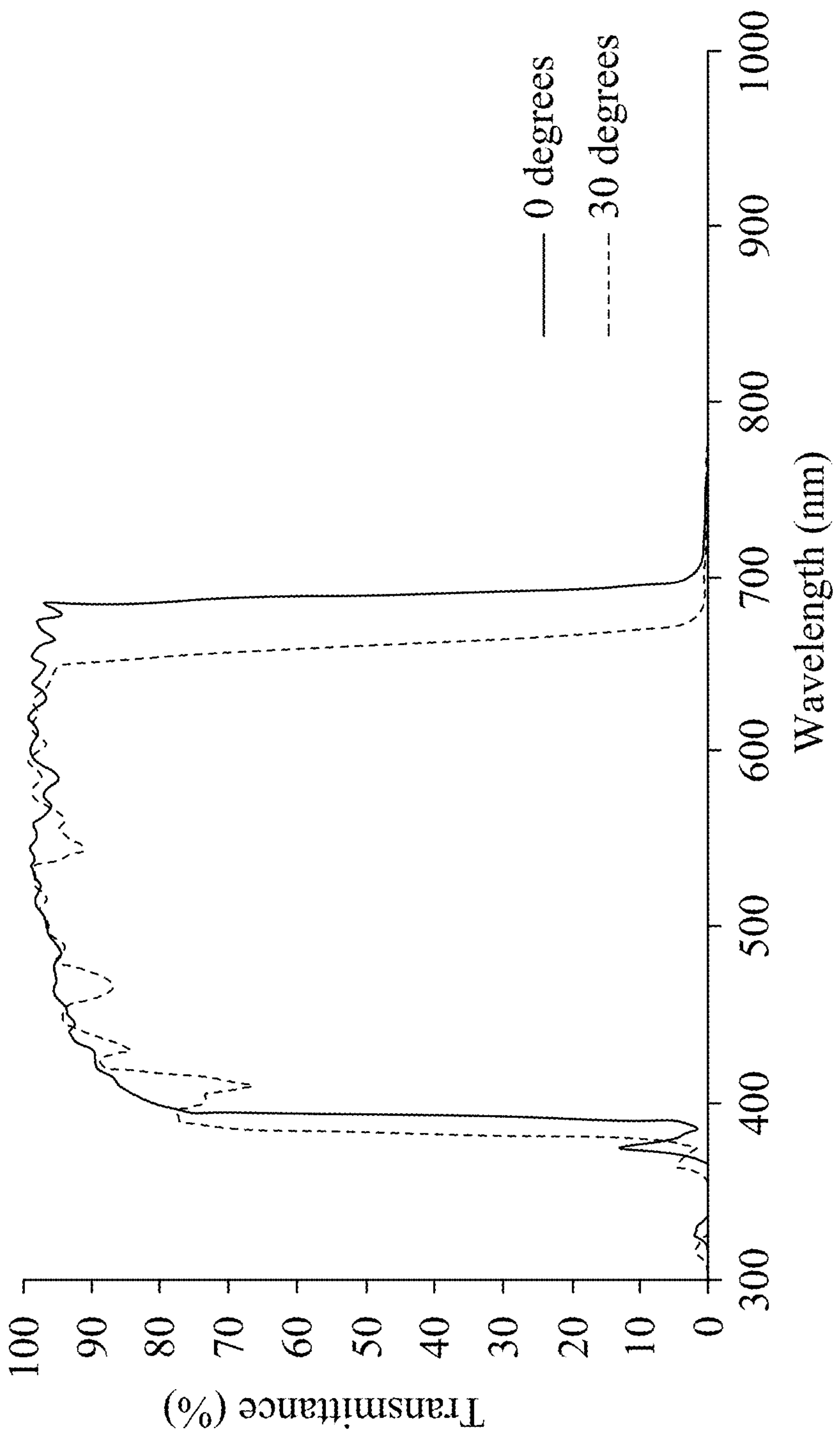
FIG. 8 is a relationship diagram of transmittance and wavelength of the optical lens element according to the 8th example.

Please refer to FIG. 8 and Table 16. FIG. 8 is a relationship diagram of transmittance and wavelength of the optical lens element according to the 8th example. The incident angles of the lights that strike on the optical lens element are 0 degrees and 30 degrees, and the transmittances of lights with different wavelengths at different incident angles are listed in Table 16. From FIG. 8 and Table 16, it shows that the optical lens element including the long wavelength filter coating according to the 8th example can effectively filter out long wavelength light, so as to improve imaging quality.

TABLE 16

| 8th Example | | | | | |
|---|---|---|---|---|---|
| 0 degrees | | Coating | | 30 degrees | |
| LWdT5 (nm) | 685-690 | tLs | 46 | LWdT5 (nm) | 660-665 |
| sLWdT5 | 9.89 | tTk (nm) | 5527 | sLWdT5 | 5.12 |
| T4050 (%) | 91.91 | HtTK (nm) | 2115 | T4050 (%) | 87.43 |
| T4060 (%) | 94.68 | LtTK (nm) | 3412 | T4060 (%) | 91.91 |
| T4350 (%) | 94.27 | LtTK/HtTK | 1.61 | T4350 (%) | 91.50 |
| T4555 (%) | 96.53 | | | T4555 (%) | 94.22 |
| T5060 (%) | 97.54 | | | T5060 (%) | 96.62 |
| T60100 (%) | 22.55 | | | T60100 (%) | 15.46 |
| T65100 (%) | 11.90 | | | T65100 (%) | 3.88 |
| T70100 (%) | 0.18 | | | T70100 (%) | 0.10 |
| T50 (%) | 96.64 | | | T50 (%) | 96.52 |
| T55 (%) | 98.34 | | | T55 (%) | 92.99 |
| T57 (%) | 96.08 | | | T57 (%) | 97.03 |
| T60 (%) | 98.99 | | | T60 (%) | 98.21 |
| T63 (%) | 96.79 | | | T63 (%) | 98.96 |
| T64 (%) | 98.64 | | | T64 (%) | 96.38 |
| T66 (%) | 97.96 | | | T66 (%) | 55.11 |
| T69 (%) | 47.64 | | | T69 (%) | 0.55 |
| T71 (%) | 0.70 | | | T71 (%) | 0.64 |

| Wavelength (nm) | Transmittance at 0 degrees (%) | Refractive index of material | Thickness (nm) | Wavelength (nm) | Transmittance at 30 degrees (%) |
|---|---|---|---|---|---|
| 300 | 0.00 | High | 12 | 300 | 0.01 |
| 305 | 0.00 | Low | 36 | 305 | 0.06 |
| 310 | 0.00 | High | 113 | 310 | 0.61 |
| 315 | 0.02 | Low | 173 | 315 | 2.29 |
| 320 | 0.28 | High | 109 | 320 | 1.27 |
| 325 | 2.00 | Low | 174 | 325 | 0.10 |
| 330 | 1.55 | High | 104 | 330 | 0.00 |
| 335 | 0.17 | Low | 158 | 335 | 0.00 |
| 340 | 0.00 | High | 96 | 340 | 0.00 |
| 345 | 0.00 | Low | 168 | 345 | 0.00 |
| 350 | 0.00 | High | 108 | 350 | 0.01 |
| 355 | 0.00 | Low | 178 | 355 | 0.13 |
| 360 | 0.00 | High | 107 | 360 | 1.04 |
| 365 | 0.02 | Low | 163 | 365 | 4.91 |
| 370 | 3.14 | High | 91 | 370 | 3.07 |
| 375 | 12.66 | Low | 161 | 375 | 1.59 |
| 380 | 4.96 | High | 106 | 380 | 9.93 |
| 385 | 1.84 | Low | 178 | 385 | 66.88 |
| 390 | 4.51 | High | 109 | 390 | 77.51 |
| 395 | 74.89 | Low | 166 | 395 | 77.63 |
| 400 | 81.17 | High | 91 | 400 | 73.53 |

TABLE 16-continued

| 8th Example | | | | | |
|---|---|---|---|---|---|
| 405 | 82.98 | Low | 155 | 405 | 73.86 |
| 410 | 86.11 | High | 104 | 410 | 66.24 |
| 415 | 87.11 | Low | 176 | 415 | 72.72 |
| 420 | 89.18 | High | 109 | 420 | 88.09 |
| 425 | 89.49 | Low | 167 | 425 | 89.05 |
| 430 | 89.72 | High | 92 | 430 | 84.38 |
| 435 | 92.28 | Low | 143 | 435 | 86.59 |
| 440 | 93.34 | High | 88 | 440 | 90.44 |
| 445 | 92.47 | Low | 140 | 445 | 93.92 |
| 450 | 93.58 | High | 84 | 450 | 94.19 |
| 455 | 93.68 | Low | 141 | 455 | 93.83 |
| 460 | 94.81 | High | 84 | 460 | 89.12 |
| 465 | 95.38 | Low | 143 | 465 | 86.85 |
| 470 | 95.30 | High | 82 | 470 | 87.35 |
| 475 | 95.47 | Low | 143 | 475 | 89.90 |
| 480 | 95.59 | High | 82 | 480 | 94.95 |
| 485 | 94.52 | Low | 143 | 485 | 94.83 |
| 490 | 95.07 | High | 84 | 490 | 93.92 |
| 495 | 96.19 | Low | 143 | 495 | 95.63 |
| 500 | 96.64 | High | 87 | 500 | 96.52 |
| 505 | 96.87 | Low | 140 | 505 | 96.43 |
| 510 | 97.38 | High | 89 | 510 | 97.95 |
| 515 | 98.23 | Low | 150 | 515 | 96.70 |
| 520 | 98.01 | High | 84 | 520 | 97.13 |
| 525 | 97.58 | Low | 73 | 525 | 98.41 |
| 530 | 98.56 | | | 530 | 98.39 |
| 535 | 98.62 | | | 535 | 98.52 |
| 540 | 98.38 | | | 540 | 94.24 |
| 545 | 98.93 | | | 545 | 90.71 |
| 550 | 98.34 | | | 550 | 92.99 |
| 555 | 98.20 | | | 555 | 94.92 |
| 560 | 98.49 | | | 560 | 93.95 |
| 565 | 96.85 | | | 565 | 94.65 |
| 570 | 96.08 | | | 570 | 97.03 |
| 575 | 97.06 | | | 575 | 98.58 |
| 580 | 96.35 | | | 580 | 98.39 |
| 585 | 94.91 | | | 585 | 97.45 |
| 590 | 95.83 | | | 590 | 98.23 |
| 595 | 97.94 | | | 595 | 99.57 |
| 600 | 98.99 | | | 600 | 98.21 |
| 605 | 98.61 | | | 605 | 96.72 |
| 610 | 97.85 | | | 610 | 98.19 |
| 615 | 98.22 | | | 615 | 99.01 |
| 620 | 99.26 | | | 620 | 97.77 |
| 625 | 98.42 | | | 625 | 98.19 |
| 630 | 96.79 | | | 630 | 98.96 |
| 635 | 97.45 | | | 635 | 97.30 |
| 640 | 98.64 | | | 640 | 96.38 |
| 645 | 97.55 | | | 645 | 95.39 |
| 650 | 97.09 | | | 650 | 94.30 |
| 655 | 98.74 | | | 655 | 78.13 |
| 660 | 97.96 | | | 660 | 55.11 |
| 665 | 95.51 | | | 665 | 29.53 |
| 670 | 97.21 | | | 670 | 7.36 |
| 675 | 97.89 | | | 675 | 2.35 |
| 680 | 94.45 | | | 680 | 1.09 |
| 685 | 97.10 | | | 685 | 0.68 |
| 690 | 47.64 | | | 690 | 0.55 |
| 695 | 10.45 | | | 695 | 0.55 |
| 700 | 3.02 | | | 700 | 0.62 |
| 705 | 1.26 | | | 705 | 0.68 |
| 710 | 0.70 | | | 710 | 0.64 |
| 715 | 0.50 | | | 715 | 0.54 |
| 720 | 0.44 | | | 720 | 0.43 |
| 725 | 0.47 | | | 725 | 0.33 |
| 730 | 0.55 | | | 730 | 0.24 |
| 735 | 0.62 | | | 735 | 0.18 |
| 740 | 0.58 | | | 740 | 0.15 |
| 745 | 0.48 | | | 745 | 0.14 |
| 750 | 0.38 | | | 750 | 0.15 |
| 755 | 0.30 | | | 755 | 0.16 |
| 760 | 0.22 | | | 760 | 0.17 |
| 765 | 0.16 | | | 765 | 0.12 |
| 770 | 0.12 | | | 770 | 0.07 |
| 775 | 0.11 | | | 775 | 0.06 |
| 780 | 0.12 | | | 780 | 0.06 |
| 785 | 0.15 | | | 785 | 0.06 |
| 790 | 0.16 | | | 790 | 0.10 |

TABLE 16-continued

| 8th Example | | | |
|---|---|---|---|
| 795 | 0.11 | 795 | 0.05 |
| 800 | 0.06 | 800 | 0.01 |
| 805 | 0.04 | 805 | 0.00 |
| 810 | 0.04 | 810 | 0.00 |
| 815 | 0.05 | 815 | 0.00 |
| 820 | 0.10 | 820 | 0.00 |
| 825 | 0.03 | 825 | 0.00 |
| 830 | 0.01 | 830 | 0.00 |
| 835 | 0.00 | 835 | 0.00 |
| 840 | 0.00 | 840 | 0.00 |
| 845 | 0.00 | 845 | 0.00 |
| 850 | 0.00 | 850 | 0.00 |
| 855 | 0.00 | 855 | 0.00 |
| 860 | 0.00 | 860 | 0.00 |
| 865 | 0.00 | 865 | 0.00 |
| 870 | 0.00 | 870 | 0.00 |
| 875 | 0.00 | 875 | 0.00 |
| 880 | 0.00 | 880 | 0.00 |
| 885 | 0.00 | 885 | 0.00 |
| 890 | 0.00 | 890 | 0.00 |
| 895 | 0.00 | 895 | 0.01 |
| 900 | 0.00 | 900 | 0.03 |
| 905 | 0.00 | 905 | 0.01 |
| 910 | 0.00 | 910 | 0.01 |
| 915 | 0.00 | 915 | 0.01 |
| 920 | 0.00 | 920 | 0.01 |
| 925 | 0.00 | 925 | 0.00 |
| 930 | 0.00 | 930 | 0.00 |
| 935 | 0.00 | 935 | 0.00 |
| 940 | 0.00 | 940 | 0.00 |
| 945 | 0.01 | 945 | 0.00 |
| 950 | 0.03 | 950 | 0.01 |
| 955 | 0.01 | 955 | 0.01 |
| 960 | 0.01 | 960 | 0.02 |
| 965 | 0.00 | 965 | 0.03 |
| 970 | 0.00 | 970 | 0.05 |
| 975 | 0.00 | 975 | 0.11 |
| 980 | 0.00 | 980 | 0.17 |
| 985 | 0.00 | 985 | 0.18 |
| 990 | 0.00 | 990 | 0.16 |
| 995 | 0.00 | 995 | 0.17 |
| 1000 | 0.00 | 1000 | 0.18 |

9th Example

The optical lens element according to the 9th example includes a long wavelength absorbing material. When an average transmittance between a wavelength of 500 nm-600 nm of the optical lens element including the long wavelength absorbing material is T5060, a transmittance at a wavelength of 570 nm of the optical lens element including the long wavelength absorbing material is T57, a transmittance at a wavelength of 690 nm of the optical lens element including the long wavelength absorbing material is T69, and a transmittance at a wavelength of 710 nm of the optical lens element including the long wavelength absorbing material is T71, the following conditions can be satisfied: 75%≤T5060; 90%≤T57<100%; T69≤5%; and T71≤5%.

Figure 9:
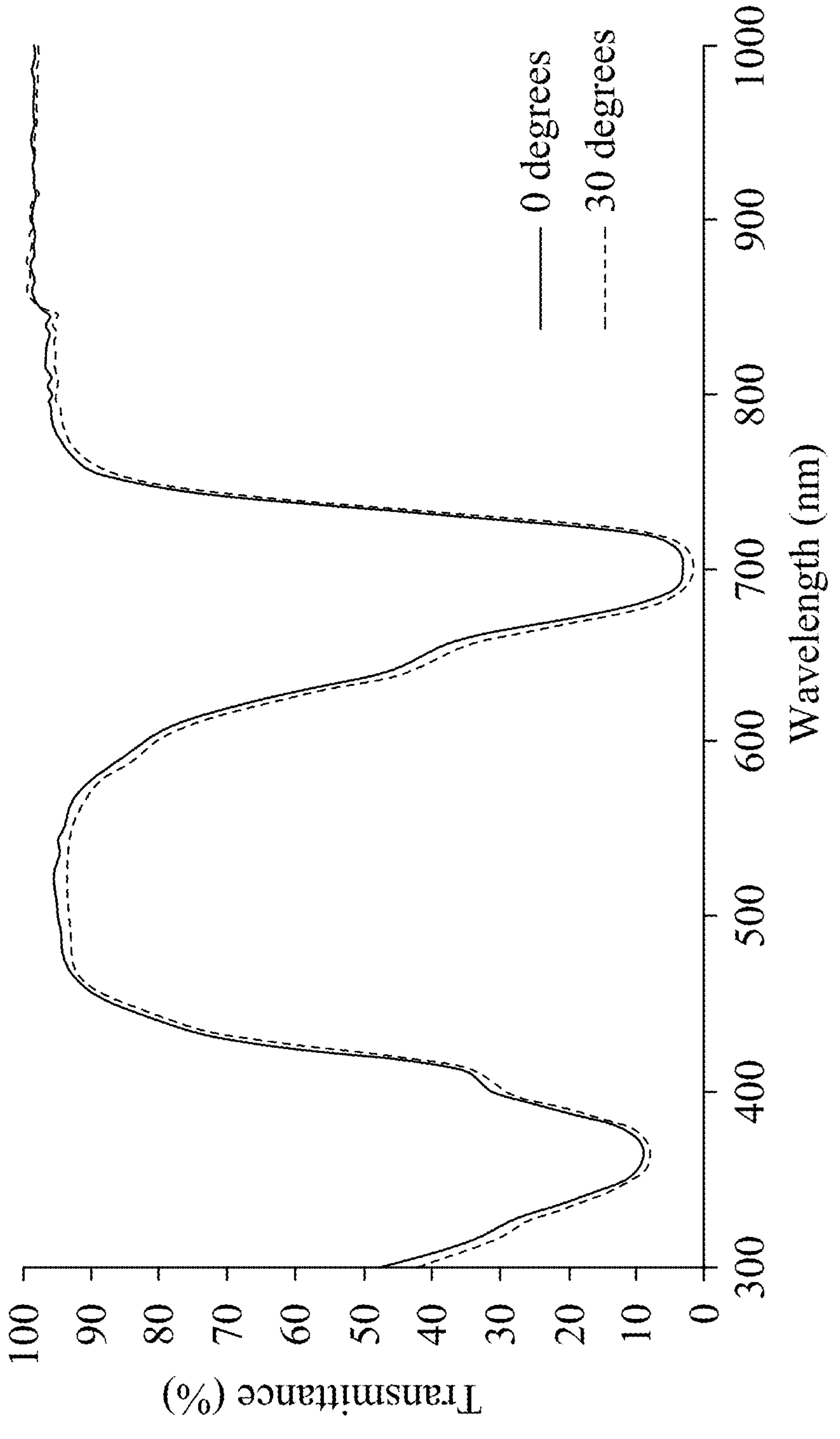
FIG. 9 is a relationship diagram of transmittance and wavelength of the optical lens element according to the 9th example.

Please refer to FIG. 9 and Table 17. FIG. 9 is a relationship diagram of transmittance and wavelength of the optical lens element according to the 9th example. The incident angles of the lights that strike on the optical lens element are 0 degrees and 30 degrees, and the transmittances of lights with different wavelengths at different incident angles are listed in Table 17. From FIG. 9 and Table 17, it shows that the optical lens element including the long wavelength absorbing material according to the 9th example can effectively filter out long wavelength light, so as to improve imaging quality.

TABLE 17

| 9th Example | | | |
|---|---|---|---|
| 0 degrees | | 30 degrees | |
| LWdT5 (nm) | 635-640 | LWdT5 (nm) | 630-635 |
| sLWdT5 | 1.11 | sLWdT5 | 1.36 |
| T4050 (%) | 74.73 | T4050 (%) | 73.33 |
| T4060 (%) | 83.37 | T4060 (%) | 81.88 |
| T4350 (%) | 88.44 | T4350 (%) | 87.21 |
| T4555 (%) | 93.94 | T4555 (%) | 92.66 |
| T5060 (%) | 92.58 | T5060 (%) | 90.99 |
| T60100 (%) | 75.28 | T60100 (%) | 74.05 |
| T65100 (%) | 76.63 | T65100 (%) | 75.60 |
| T70100 (%) | 85.83 | T70100 (%) | 85.08 |
| T50 (%) | 95.28 | T50 (%) | 93.53 |
| T55 (%) | 94.61 | T55 (%) | 93.17 |
| T57 (%) | 92.42 | T57 (%) | 90.82 |
| T60 (%) | 82.90 | T60 (%) | 80.97 |
| T63 (%) | 59.56 | T63 (%) | 56.55 |
| T64 (%) | 47.29 | T64 (%) | 44.19 |
| T66 (%) | 34.76 | T66 (%) | 31.15 |
| T69 (%) | 3.98 | T69 (%) | 2.44 |
| T71 (%) | 3.71 | T71 (%) | 2.38 |

TABLE 17-continued

| 9th Example | | | |
|---|---|---|---|
| Wavelength (nm) | Transmittance at 0 degrees (%) | Wavelength (nm) | Transmittance at 30 degrees (%) |
| 300 | 47.65 | 300 | 42.71 |
| 305 | 42.35 | 305 | 38.13 |
| 310 | 38.24 | 310 | 34.72 |
| 315 | 34.24 | 315 | 31.15 |
| 320 | 31.70 | 320 | 28.50 |
| 325 | 29.64 | 325 | 26.71 |
| 330 | 25.47 | 330 | 23.13 |
| 335 | 21.29 | 335 | 19.48 |
| 340 | 17.38 | 340 | 15.97 |
| 345 | 14.39 | 345 | 13.27 |
| 350 | 11.92 | 350 | 10.89 |
| 355 | 10.01 | 355 | 9.08 |
| 360 | 9.12 | 360 | 8.25 |
| 365 | 8.98 | 365 | 8.14 |
| 370 | 9.02 | 370 | 8.19 |
| 375 | 9.64 | 375 | 8.79 |
| 380 | 12.19 | 380 | 11.19 |
| 385 | 16.90 | 385 | 15.67 |
| 390 | 22.02 | 390 | 20.63 |
| 395 | 26.70 | 395 | 25.20 |
| 400 | 30.61 | 400 | 29.03 |
| 405 | 32.82 | 405 | 31.14 |
| 410 | 34.14 | 410 | 32.44 |
| 415 | 38.30 | 415 | 36.40 |
| 420 | 47.71 | 420 | 45.58 |
| 425 | 59.25 | 425 | 57.09 |
| 430 | 68.77 | 430 | 66.86 |
| 435 | 74.80 | 435 | 72.97 |
| 440 | 79.48 | 440 | 77.83 |
| 445 | 83.04 | 445 | 81.68 |
| 450 | 86.22 | 450 | 85.16 |
| 455 | 88.80 | 455 | 88.12 |
| 460 | 91.08 | 460 | 90.65 |
| 465 | 92.51 | 465 | 92.14 |
| 470 | 93.43 | 470 | 92.86 |
| 475 | 94.04 | 475 | 93.10 |
| 480 | 94.46 | 480 | 93.26 |
| 485 | 94.78 | 485 | 93.34 |
| 490 | 94.85 | 490 | 93.30 |
| 495 | 95.01 | 495 | 93.42 |
| 500 | 95.28 | 500 | 93.53 |
| 505 | 95.33 | 505 | 93.68 |
| 510 | 95.45 | 510 | 93.75 |
| 515 | 95.43 | 515 | 93.80 |
| 520 | 95.48 | 520 | 93.91 |
| 525 | 95.40 | 525 | 93.94 |
| 530 | 95.37 | 530 | 93.81 |
| 535 | 95.29 | 535 | 93.83 |
| 540 | 95.07 | 540 | 93.65 |
| 545 | 94.91 | 545 | 93.53 |
| 550 | 94.61 | 550 | 93.17 |
| 555 | 94.37 | 555 | 92.91 |
| 560 | 93.82 | 560 | 92.36 |
| 565 | 93.19 | 565 | 91.70 |
| 570 | 92.42 | 570 | 90.82 |
| 575 | 91.24 | 575 | 89.69 |
| 580 | 89.73 | 580 | 88.18 |
| 585 | 88.01 | 585 | 86.32 |
| 590 | 86.26 | 590 | 84.46 |
| 595 | 84.62 | 595 | 82.78 |
| 600 | 82.90 | 600 | 80.97 |
| 605 | 80.76 | 605 | 78.75 |
| 610 | 78.14 | 610 | 75.92 |
| 615 | 74.77 | 615 | 72.37 |
| 620 | 70.75 | 620 | 68.20 |
| 625 | 65.68 | 625 | 62.92 |
| 630 | 59.56 | 630 | 56.55 |
| 635 | 52.86 | 635 | 49.74 |
| 640 | 47.29 | 640 | 44.19 |
| 645 | 44.16 | 645 | 40.97 |
| 650 | 41.85 | 650 | 38.70 |
| 655 | 38.94 | 655 | 35.67 |
| 660 | 34.76 | 660 | 31.15 |
| 665 | 29.15 | 665 | 25.37 |
| 670 | 22.46 | 670 | 18.82 |
| 675 | 15.56 | 675 | 12.43 |
| 680 | 9.66 | 680 | 7.17 |
| 685 | 5.83 | 685 | 3.92 |
| 690 | 3.98 | 690 | 2.44 |
| 695 | 3.30 | 695 | 1.94 |
| 700 | 3.17 | 700 | 1.83 |
| 705 | 3.28 | 705 | 1.94 |
| 710 | 3.71 | 710 | 2.38 |
| 715 | 5.19 | 715 | 3.70 |
| 720 | 9.55 | 720 | 7.62 |
| 725 | 19.19 | 725 | 16.62 |
| 730 | 34.44 | 730 | 31.41 |
| 735 | 52.01 | 735 | 48.90 |
| 740 | 66.83 | 740 | 64.12 |
| 745 | 77.67 | 745 | 75.36 |
| 750 | 84.81 | 750 | 82.84 |
| 755 | 88.78 | 755 | 87.06 |
| 760 | 91.67 | 760 | 89.91 |
| 765 | 93.21 | 765 | 91.70 |
| 770 | 94.36 | 770 | 92.89 |
| 775 | 95.01 | 775 | 93.78 |
| 780 | 95.62 | 780 | 94.30 |
| 785 | 95.88 | 785 | 94.78 |
| 790 | 96.18 | 790 | 94.81 |
| 795 | 96.41 | 795 | 95.42 |
| 800 | 96.16 | 800 | 95.45 |
| 805 | 96.64 | 805 | 95.47 |
| 810 | 96.29 | 810 | 95.22 |
| 815 | 96.96 | 815 | 95.83 |
| 820 | 96.89 | 820 | 95.72 |
| 825 | 96.94 | 825 | 95.47 |
| 830 | 96.72 | 830 | 95.97 |
| 835 | 96.47 | 835 | 95.54 |
| 840 | 96.99 | 840 | 95.96 |
| 845 | 96.42 | 845 | 95.02 |
| 850 | 98.15 | 850 | 98.29 |
| 855 | 98.62 | 855 | 99.46 |
| 860 | 98.96 | 860 | 99.92 |
| 865 | 98.75 | 865 | 99.36 |
| 870 | 98.84 | 870 | 99.20 |
| 875 | 99.23 | 875 | 99.94 |
| 880 | 98.63 | 880 | 99.39 |
| 885 | 98.85 | 885 | 99.07 |
| 890 | 98.80 | 890 | 99.42 |
| 895 | 98.64 | 895 | 99.05 |
| 900 | 98.92 | 900 | 99.12 |
| 905 | 98.95 | 905 | 99.26 |
| 910 | 98.67 | 910 | 98.90 |
| 915 | 98.39 | 915 | 98.06 |
| 920 | 98.79 | 920 | 98.67 |
| 925 | 98.80 | 925 | 98.62 |
| 930 | 98.89 | 930 | 98.85 |
| 935 | 98.69 | 935 | 98.69 |
| 940 | 98.94 | 940 | 98.64 |
| 945 | 98.86 | 945 | 98.63 |
| 950 | 98.86 | 950 | 98.71 |
| 955 | 98.82 | 955 | 98.35 |
| 960 | 98.75 | 960 | 98.66 |
| 965 | 98.83 | 965 | 98.51 |
| 970 | 98.81 | 970 | 98.43 |
| 975 | 98.65 | 975 | 98.42 |
| 980 | 98.78 | 980 | 98.20 |
| 985 | 98.95 | 985 | 98.54 |
| 990 | 98.72 | 990 | 98.13 |
| 995 | 98.59 | 995 | 98.23 |
| 1000 | 98.81 | 1000 | 98.14 |

10th Example

The optical lens element group according to the 10th example includes an optical lens element including a long wavelength filter coating and an optical lens element including a long wavelength absorbing material. When a total number of coating layers of the long wavelength filter coating is tLs, a total thickness of coating layers of the long wavelength filter coating is tTk, an average transmittance between a wavelength of 500 nm-600 nm of at least one of the optical lens element including the long wavelength absorbing material and the optical lens element including the long wavelength filter coating is T5060, and an average transmittance between a wavelength of 650 nm-1000 nm of at least one of the optical lens element including the long wavelength absorbing material and the optical lens element including the long wavelength filter coating is T65100, the following conditions can be satisfied: $40 \leq tLs \leq 90$; $4000\ nm < tTk \leq 10000\ nm$; $75\% \leq T5060$; and $T65100 \leq 5\%$.

Figure 10:
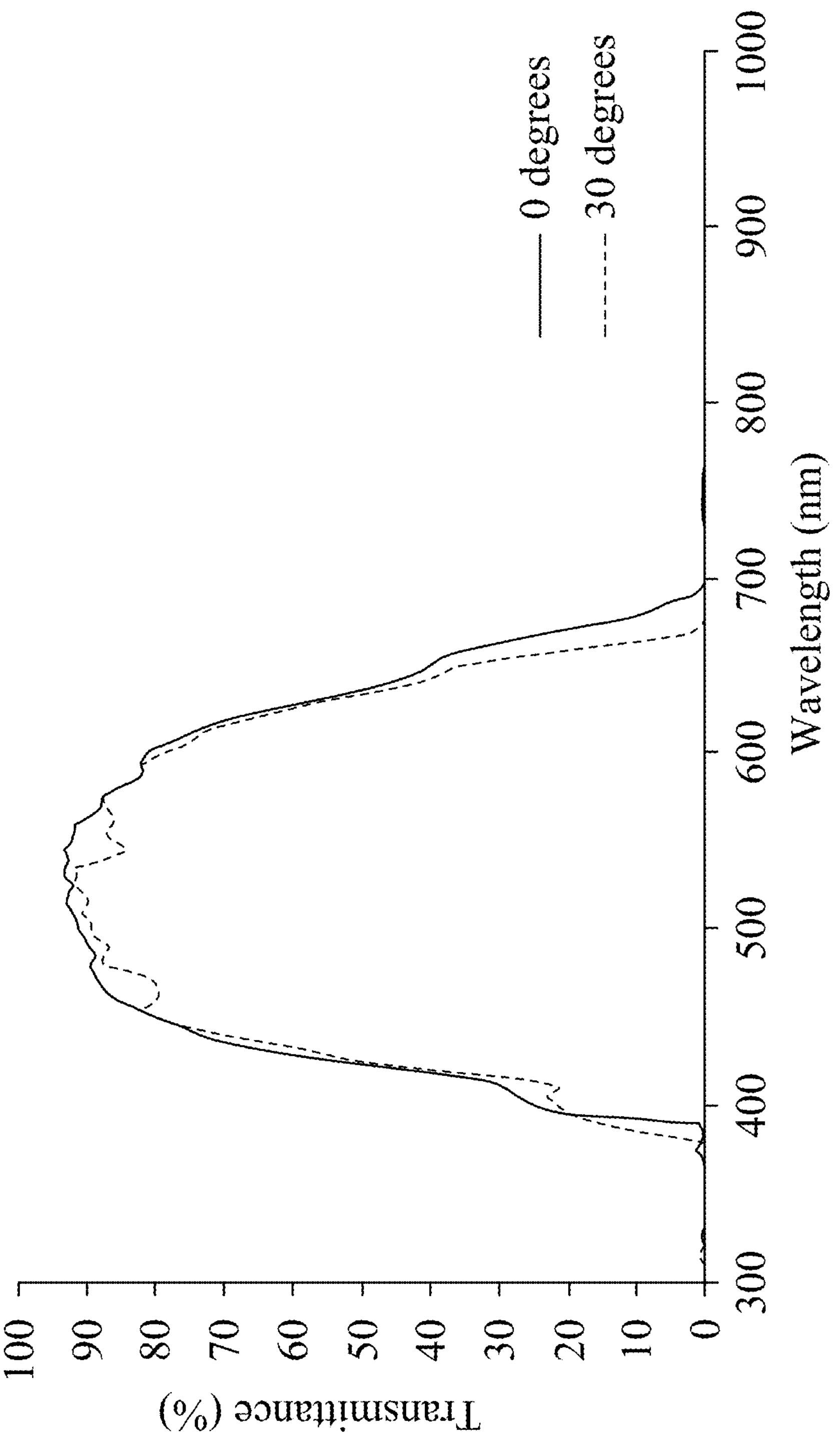
FIG. 10 is a relationship diagram of transmittance and wavelength of the optical lens element group according to the 10th example.

Please refer to FIG. 10 and Table 18. FIG. 10 is a relationship diagram of transmittance and wavelength of the optical lens element group according to the 10th example. The incident angles of the lights that strike on the optical lens element group are 0 degrees and 30 degrees, and the transmittances of lights with different wavelengths at different incident angles are listed in Table 18. From FIG. 10 and Table 18, it shows that the optical lens element group according to the 10th example can effectively filter out long wavelength light, so as to improve imaging quality.

TABLE 18

| 10th Example | | | | | |
|---|---|---|---|---|---|
| 0 degrees | | Coating | | 30 degrees | |
| LWdT5 (nm) | 635-640 | tLs | 46 | LWdT5 (nm) | 630-635 |
| sLWdT5 | 0.97 | tTk (nm) | 5527 | sLWdT5 | 1.51 |
| T4050 (%) | 69.66 | HtTK (nm) | 2115 | T4050 (%) | 65.85 |
| T4060 (%) | 79.69 | LtTK (nm) | 3412 | T4060 (%) | 76.53 |
| T4350 (%) | 83.50 | LtTK/HtTK | 1.61 | T4350 (%) | 79.97 |
| T4555 (%) | 90.71 | | | T4555 (%) | 87.33 |
| T5060 (%) | 90.31 | | | T5060 (%) | 87.87 |
| T60100 (%) | 10.42 | | | T60100 (%) | 8.76 |
| T65100 (%) | 2.80 | | | T65100 (%) | 1.32 |
| T70100 (%) | 0.06 | | | T70100 (%) | 0.04 |
| T50 (%) | 92.07 | | | T50 (%) | 90.27 |
| T55 (%) | 93.04 | | | T55 (%) | 86.63 |
| T57 (%) | 88.79 | | | T57 (%) | 88.12 |
| T60 (%) | 82.07 | | | T60 (%) | 79.52 |
| T63 (%) | 57.65 | | | T63 (%) | 55.97 |
| T64 (%) | 46.65 | | | T64 (%) | 42.59 |
| T66 (%) | 34.05 | | | T66 (%) | 17.17 |
| T69 (%) | 1.90 | | | T69 (%) | 0.01 |
| T71 (%) | 0.03 | | | T71 (%) | 0.02 |

| Wavelength (nm) | Transmittance at 0 degrees (%) | Refractive index of material | Thickness (nm) | Wavelength (nm) | Transmittance at 30 degrees (%) |
|---|---|---|---|---|---|
| 300 | 0.00 | High | 12 | 300 | 0.01 |
| 305 | 0.00 | Low | 36 | 305 | 0.02 |
| 310 | 0.00 | High | 113 | 310 | 0.21 |
| 315 | 0.01 | Low | 173 | 315 | 0.71 |
| 320 | 0.09 | High | 109 | 320 | 0.36 |
| 325 | 0.59 | Low | 174 | 325 | 0.03 |
| 330 | 0.39 | High | 104 | 330 | 0.00 |
| 335 | 0.04 | Low | 158 | 335 | 0.00 |
| 340 | 0.00 | High | 96 | 340 | 0.00 |
| 345 | 0.00 | Low | 168 | 345 | 0.00 |
| 350 | 0.00 | High | 108 | 350 | 0.00 |
| 355 | 0.00 | Low | 178 | 355 | 0.01 |
| 360 | 0.00 | High | 107 | 360 | 0.09 |
| 365 | 0.00 | Low | 163 | 365 | 0.40 |
| 370 | 0.28 | High | 91 | 370 | 0.25 |
| 375 | 1.22 | Low | 161 | 375 | 0.14 |
| 380 | 0.60 | High | 106 | 380 | 1.11 |
| 385 | 0.31 | Low | 178 | 385 | 10.48 |
| 390 | 0.99 | High | 109 | 390 | 15.99 |
| 395 | 19.99 | Low | 166 | 395 | 19.56 |
| 400 | 24.85 | High | 91 | 400 | 21.34 |
| 405 | 27.23 | Low | 155 | 405 | 23.00 |
| 410 | 29.40 | High | 104 | 410 | 21.49 |
| 415 | 33.37 | Low | 176 | 415 | 26.47 |
| 420 | 42.54 | High | 109 | 420 | 40.15 |
| 425 | 53.02 | Low | 167 | 425 | 50.84 |
| 430 | 61.70 | High | 92 | 430 | 56.42 |
| 435 | 69.03 | Low | 143 | 435 | 63.18 |
| 440 | 74.19 | High | 88 | 440 | 70.39 |
| 445 | 76.78 | Low | 140 | 445 | 76.71 |
| 450 | 80.68 | High | 84 | 450 | 80.21 |
| 455 | 83.19 | Low | 141 | 455 | 82.68 |
| 460 | 86.35 | High | 84 | 460 | 80.79 |
| 465 | 88.24 | Low | 143 | 465 | 80.03 |
| 470 | 89.04 | High | 82 | 470 | 81.12 |
| 475 | 89.77 | Low | 143 | 475 | 83.69 |
| 480 | 90.30 | High | 82 | 480 | 88.55 |

TABLE 18-continued

| 10th Example | | | | | |
|---|---|---|---|---|---|
| 485 | 89.58 | Low | 143 | 485 | 88.52 |
| 490 | 90.17 | High | 84 | 490 | 87.64 |
| 495 | 91.38 | Low | 143 | 495 | 89.34 |
| 500 | 92.07 | High | 87 | 500 | 90.27 |
| 505 | 92.35 | Low | 140 | 505 | 90.34 |
| 510 | 92.96 | High | 89 | 510 | 91.82 |
| 515 | 93.74 | Low | 150 | 515 | 90.71 |
| 520 | 93.58 | High | 84 | 520 | 91.22 |
| 525 | 93.09 | Low | 73 | 525 | 92.44 |
| 530 | 94.00 | | | 530 | 92.30 |
| 535 | 93.98 | | | 535 | 92.45 |
| 540 | 93.53 | | | 540 | 88.25 |
| 545 | 93.89 | | | 545 | 84.84 |
| 550 | 93.04 | | | 550 | 86.63 |
| 555 | 92.68 | | | 555 | 88.18 |
| 560 | 92.40 | | | 560 | 86.77 |
| 565 | 90.26 | | | 565 | 86.80 |
| 570 | 88.79 | | | 570 | 88.12 |
| 575 | 88.56 | | | 575 | 88.42 |
| 580 | 86.45 | | | 580 | 86.76 |
| 585 | 83.53 | | | 585 | 84.12 |
| 590 | 82.66 | | | 590 | 82.97 |
| 595 | 82.88 | | | 595 | 82.42 |
| 600 | 82.07 | | | 600 | 79.52 |
| 605 | 79.64 | | | 605 | 76.17 |
| 610 | 76.46 | | | 610 | 74.54 |
| 615 | 73.44 | | | 615 | 71.66 |
| 620 | 70.23 | | | 620 | 66.68 |
| 625 | 64.64 | | | 625 | 61.78 |
| 630 | 57.65 | | | 630 | 55.97 |
| 635 | 51.52 | | | 635 | 48.40 |
| 640 | 46.65 | | | 640 | 42.59 |
| 645 | 43.07 | | | 645 | 39.08 |
| 650 | 40.64 | | | 650 | 36.50 |
| 655 | 38.45 | | | 655 | 27.87 |
| 660 | 34.05 | | | 660 | 17.17 |
| 665 | 27.84 | | | 665 | 7.49 |
| 670 | 21.83 | | | 670 | 1.38 |
| 675 | 15.23 | | | 675 | 0.29 |
| 680 | 9.12 | | | 680 | 0.08 |
| 685 | 5.66 | | | 685 | 0.03 |
| 690 | 1.90 | | | 690 | 0.01 |
| 695 | 0.34 | | | 695 | 0.01 |
| 700 | 0.10 | | | 700 | 0.01 |
| 705 | 0.04 | | | 705 | 0.01 |
| 710 | 0.03 | | | 710 | 0.02 |
| 715 | 0.03 | | | 715 | 0.02 |
| 720 | 0.04 | | | 720 | 0.03 |
| 725 | 0.09 | | | 725 | 0.05 |
| 730 | 0.19 | | | 730 | 0.08 |
| 735 | 0.32 | | | 735 | 0.09 |
| 740 | 0.39 | | | 740 | 0.09 |
| 745 | 0.37 | | | 745 | 0.10 |
| 750 | 0.33 | | | 750 | 0.13 |
| 755 | 0.26 | | | 755 | 0.14 |
| 760 | 0.20 | | | 760 | 0.15 |
| 765 | 0.15 | | | 765 | 0.11 |
| 770 | 0.12 | | | 770 | 0.07 |
| 775 | 0.10 | | | 775 | 0.06 |
| 780 | 0.11 | | | 780 | 0.05 |
| 785 | 0.14 | | | 785 | 0.05 |
| 790 | 0.16 | | | 790 | 0.10 |
| 795 | 0.10 | | | 795 | 0.05 |
| 800 | 0.06 | | | 800 | 0.01 |
| 805 | 0.04 | | | 805 | 0.00 |
| 810 | 0.04 | | | 810 | 0.00 |
| 815 | 0.05 | | | 815 | 0.00 |
| 820 | 0.09 | | | 820 | 0.00 |
| 825 | 0.03 | | | 825 | 0.00 |
| 830 | 0.01 | | | 830 | 0.00 |
| 835 | 0.00 | | | 835 | 0.00 |
| 840 | 0.00 | | | 840 | 0.00 |
| 845 | 0.00 | | | 845 | 0.00 |
| 850 | 0.00 | | | 850 | 0.00 |
| 855 | 0.00 | | | 855 | 0.00 |
| 860 | 0.00 | | | 860 | 0.00 |
| 865 | 0.00 | | | 865 | 0.00 |
| 870 | 0.00 | | | 870 | 0.00 |

TABLE 18-continued

| 10th Example | | | |
|---|---|---|---|
| 875 | 0.00 | 875 | 0.00 |
| 880 | 0.00 | 880 | 0.00 |
| 885 | 0.00 | 885 | 0.00 |
| 890 | 0.00 | 890 | 0.00 |
| 895 | 0.00 | 895 | 0.01 |
| 900 | 0.00 | 900 | 0.03 |
| 905 | 0.00 | 905 | 0.01 |
| 910 | 0.00 | 910 | 0.01 |
| 915 | 0.00 | 915 | 0.00 |
| 920 | 0.00 | 920 | 0.01 |
| 925 | 0.00 | 925 | 0.00 |
| 930 | 0.00 | 930 | 0.00 |
| 935 | 0.00 | 935 | 0.00 |
| 940 | 0.00 | 940 | 0.00 |
| 945 | 0.01 | 945 | 0.00 |
| 950 | 0.03 | 950 | 0.01 |
| 955 | 0.01 | 955 | 0.01 |
| 960 | 0.01 | 960 | 0.02 |
| 965 | 0.00 | 965 | 0.03 |
| 970 | 0.00 | 970 | 0.05 |
| 975 | 0.00 | 975 | 0.11 |
| 980 | 0.00 | 980 | 0.17 |
| 985 | 0.00 | 985 | 0.18 |
| 990 | 0.00 | 990 | 0.16 |
| 995 | 0.00 | 995 | 0.16 |
| 1000 | 0.00 | 1000 | 0.18 |

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising:

at least three optical lens elements;

wherein at least one of the at least three optical lens elements comprises a long wavelength absorbing material;

wherein at least one of the at least three optical lens elements comprises a long wavelength filter coating, the long wavelength filter coating is arranged on an object-side surface or an image-side surface of the at least one optical lens element comprising the long wavelength filter coating, the long wavelength filter coating comprises a plurality of high refractive index coating layers and a plurality of low refractive index coating layers, and the plurality of high refractive index coating layers and the plurality of low refractive index coating layers are stacked in alternations;

wherein a maximum of filter coating arranging factors of the at least three optical lens elements is FcMax, a maximum of absorbing material arranging factors of the at least three optical lens elements is FaMax, an average transmittance between a wavelength of 700 nm-1000 nm of at least one of the at least one optical lens element comprising the long wavelength absorbing material and the at least one optical lens element comprising the long wavelength filter coating is T70100, a total thickness of coating layers of the long wavelength filter coating is tTk, and the following conditions are satisfied:

$$3.5 \leq FcMax \times FaMax;\ T70100 \leq 10\%;\ \text{and } 4500\ \text{nm} < tTk \leq 9000\ \text{nm}.$$

2. The optical lens assembly of claim 1, wherein the maximum of the filter coating arranging factors of the at least three optical lens elements is FcMax, the maximum of the absorbing material arranging factors of the at least three optical lens elements is FaMax, and the following condition is satisfied:

$$4 \leq FcMax \times FaMax.$$

3. The optical lens assembly of claim 2, wherein the total thickness of coating layers of the long wavelength filter coating is tTk, and the following condition is satisfied:

$$4700\ \text{nm} < tTk \leq 9000\ \text{nm}.$$

4. The optical lens assembly of claim 3, wherein a total number of coating layers of the long wavelength filter coating is tLs, and the following condition is satisfied:

$$42 \leq tLs \leq 80.$$

5. The optical lens assembly of claim 1, wherein a total thickness of the plurality of high refractive index coating layers of the long wavelength filter coating is HtTk, a total thickness of the plurality of low refractive index coating layers of the long wavelength filter coating is LtTk, and the following condition is satisfied:

$$1.3 \leq LtTK/HtTK \leq 2.1.$$

6. The optical lens assembly of claim 1, wherein an average of a track length ratio of a chief ray in a whole field of view of each of the at least three optical lens elements is aCPavg, and the following condition is satisfied:

$$0.50 \leq aCPavg \leq 1.5.$$

7. The optical lens assembly of claim 6, wherein the at least one optical lens element comprising the long wavelength absorbing material is made of a plastic material.

8. The optical lens assembly of claim 7, wherein the long wavelength absorbing material is evenly mixed with the plastic material.

9. The optical lens assembly of claim 1, wherein a wavelength of 50% transmittance of at least one of the at least one optical lens element comprising the long wavelength absorbing material, the at least one optical lens element comprising the long wavelength filter coating and the optical lens assembly in a long wavelength region where wavelength and transmittance are negatively correlated is LWdT5, and the following condition is satisfied:

$$600\text{ nm} \leq LWdT5 < 700\text{ nm}.$$

10. The optical lens assembly of claim 9, wherein the at least one optical lens element comprising the long wavelength absorbing material is closer to an object side of the optical lens assembly than the at least one optical lens element comprising the long wavelength filter coating.

11. An imaging apparatus, comprising:

the optical lens assembly of claim 1; and an image sensor disposed on an image surface of the optical lens assembly.

12. An electronic device, which is a mobile device, and the electronic device comprising:

the imaging apparatus of claim 11.

* * * * *